United States Patent
Ogata

(10) Patent No.: US 10,525,594 B2
(45) Date of Patent: Jan. 7, 2020

(54) TEACHING SYSTEM, ROBOT SYSTEM, AND TEACHING METHOD

(71) Applicant: KABUSHIKI KAISHA YASKAWA DENKI, Kitakyushu-shi (JP)

(72) Inventor: Nobuyoshi Ogata, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 636 days.

(21) Appl. No.: 14/835,725

(22) Filed: Aug. 26, 2015

(65) Prior Publication Data

US 2016/0059413 A1   Mar. 3, 2016

(30) Foreign Application Priority Data

Aug. 29, 2014   (JP) ................. 2014-176455

(51) Int. Cl.
*B25J 9/16* (2006.01)

(52) U.S. Cl.
CPC .......... *B25J 9/1676* (2013.01); *B25J 9/1666* (2013.01); *G05B 2219/40317* (2013.01); *G05B 2219/40476* (2013.01); *Y10S 901/03* (2013.01); *Y10S 901/41* (2013.01)

(58) Field of Classification Search
CPC combination set(s) only.
See application file for complete search history.

(56) References Cited

U.S. PATENT DOCUMENTS

2003/0090483 A1* 5/2003 Watanabe ............... B25J 9/1671
                                                           345/419
2004/0138779 A1   7/2004 Shibata et al.
2004/0172168 A1* 9/2004 Watanabe ............... B25J 9/1664
                                                           700/264
(Continued)

FOREIGN PATENT DOCUMENTS

CN   1680079   10/2005
EP   1256860   11/2002
(Continued)

OTHER PUBLICATIONS

Extended European Search Report for corresponding EP Application No. 15182318.4-1870, dated May 31, 2016.
(Continued)

*Primary Examiner* — Cuong B Nguyen
(74) *Attorney, Agent, or Firm* — Mori & Ward, LLP

(57) ABSTRACT

A teaching system includes: a teaching-data generator configured to generate teaching data of a robot having a joint in a virtual environment, the virtual environment including a work tool, the robot, and a workpiece to which a plurality of working points is preliminarily set, the teaching data causing the robot to move one of the work tool and the workpiece passing through approach points corresponding to the respective working points to cause the work tool to relatively reach and separate from the working points; a determiner configured to determine whether a virtual line interferes with another of the workpiece and the work tool, the virtual line connecting the approach points of the consecutively worked working points together; and a teaching-data updater capable of changing a position of the approach point on the virtual line.

18 Claims, 13 Drawing Sheets

(56) References Cited

U.S. PATENT DOCUMENTS

| | | | | |
|---|---|---|---|---|
| 2009/0125146 A1* | 5/2009 | Zhang | ............... | B25J 9/1664 |
| | | | | 700/253 |
| 2012/0277909 A1* | 11/2012 | Ouchi | ............... | B25J 9/1661 |
| | | | | 700/254 |
| 2013/0116822 A1* | 5/2013 | Atohira | ............ | G05B 19/4097 |
| | | | | 700/255 |

FOREIGN PATENT DOCUMENTS

| EP | 1584999 | 10/2005 |
|----|---------|---------|
| JP | 2003-091304 | 3/2003 |
| JP | 2007-144538 | 6/2007 |
| JP | 2012-024867 | 2/2012 |
| WO | WO 2015/166574 | 11/2015 |

OTHER PUBLICATIONS

Chinese Office Action for corresponding CN Application No. 201510534768.1, dated Nov. 7, 2016.

Japanese Office Action for corresponding JP Application No. 2014-176455, dated Jan. 9, 2018 (w/ English machine translation).

European Office Action for corresponding EP Application No. 15182318.4, dated Jun. 24, 2019.

* cited by examiner

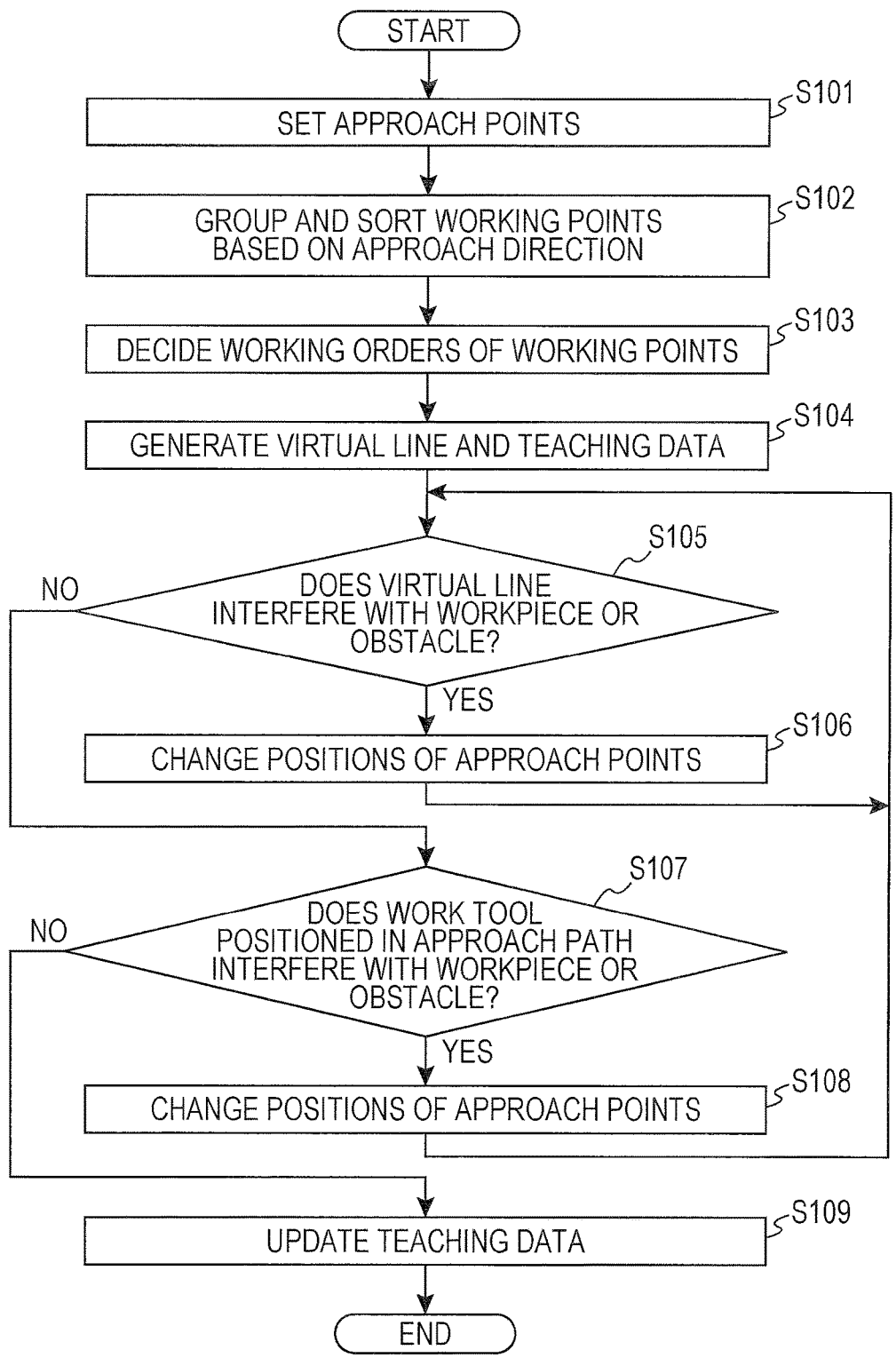

TEACHING SYSTEM, ROBOT SYSTEM, AND TEACHING METHOD

CROSS-REFERENCE TO RELATED APPLICATION

This application claims priority from Japanese Patent Application No. 2014-176455 filed with the Japan Patent Office on Aug. 29, 2014, the entire content of which is hereby incorporated by reference.

BACKGROUND

1. Technical Field

The embodiment of the disclosure relates to a teaching system, a robot system, and a teaching method.

2. Description of the Related Art

Typically, there is known a teaching system that generates teaching data while simulating the operation of a robot. This teaching system generates the teaching data while causing operation of a three-dimensional model of a robot or the like on a virtual space, which reconfigures (reproduces) the actual workplace.

The teaching data in the above-described teaching system is, for example, operation path data of the robot in the case where the robot accesses a target object while following the retreated position from an obstacle specified by an operator (for example, see JP-A-2012-24867).

SUMMARY

A teaching system according to one aspect of an embodiment includes: a teaching-data generator configured to generate teaching data of a robot having a joint in a virtual environment, the virtual environment including a work tool, the robot, and a workpiece to which a plurality of working points is preliminarily set, the work tool being configured to work on the working points, the teaching data causing the robot to move one of the work tool and the workpiece passing through approach points corresponding to the respective working points to cause the work tool to relatively reach and separate from the working points; a determiner configured to determine whether a virtual line interferes with another of the workpiece and the work tool, the virtual line connecting the approach points of the consecutively worked working points together; and a teaching-data updater configured to change a position of the approach point on the virtual line in a case where the determiner determines that the virtual line interferes with the other of the workpiece and the work tool.

BRIEF DESCRIPTION OF THE DRAWINGS

FIG. 8 is a flowchart illustrating the procedure for performing the teaching method according to the embodiment;

DESCRIPTION OF THE EMBODIMENTS

Figure 1:
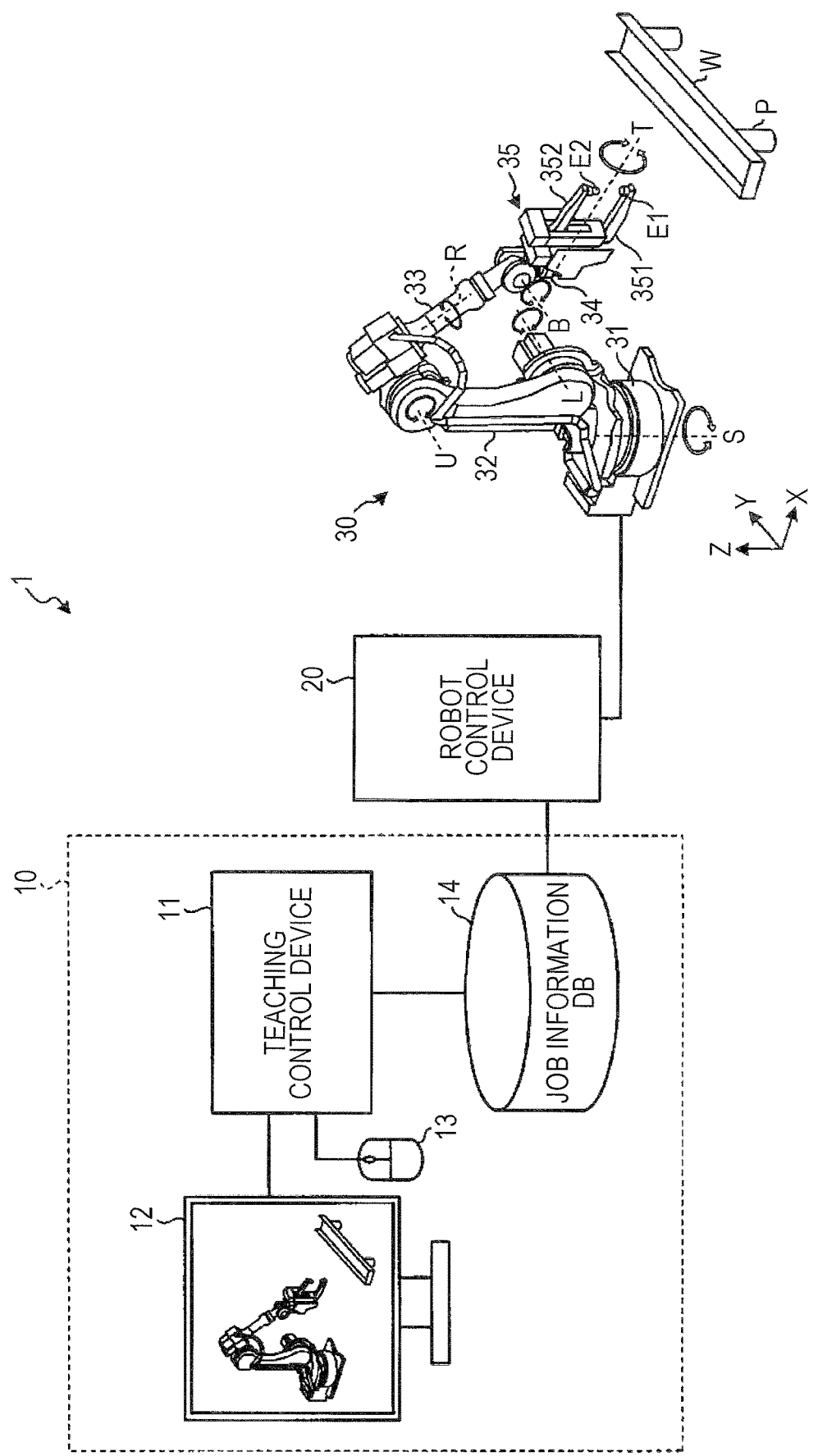
FIG. 1 is a pattern diagram illustrating the overall configuration of a robot system including a teaching system according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The following describes embodiments of a teaching system, a robot system, and a teaching method disclosed in this application in detail with reference to the accompanying drawings. Here, the following embodiments do not limit the technique of this disclosure.

Hereinafter, a description is given of a teaching system that displays a graphic image of a three-dimensional model of a robot on a display unit such as a display as an example. Here, the above-described graphic image of the three-dimensional model is sometimes described as a "virtual image" below.

Hereinafter, a description is given of a welding robot system including a spot welding robot as an example. Here, the welding robot system is not limited to the spot welding robot, and may be, for example, a machining robot system. The machining robot system includes a robot that can perform machining for points, lines, or surfaces, for example, arc welding processing, screw tightening processing, punching processing, application processing of a sealing material or the like, or polishing processing. Hereinafter, the spot welding robot is described as a "robot." Furthermore, the welding robot system is described as a "robot system."

FIG. 1 is a pattern diagram illustrating the overall configuration of a robot system 1 including a teaching system 10 according to an embodiment.

As illustrated in FIG. 1, the robot system 1 includes the teaching system 10, a robot control device 20, and a robot 30. The teaching system 10 includes a teaching control device 11, a display unit 12, an operation unit 13, and a job information database (DB) 14.

The teaching control device 11 is a controller that controls the overall teaching system 10, and includes an arithmetic processing unit, a storage device, and the like. The teaching control device 11 is coupled to various devices including the display unit 12 in the teaching system 10 to allow information communication.

The teaching control device 11 outputs a virtual image to the display unit 12. The virtual image includes the result of the simulatively calculated operation of the robot 30 or the like based on the operation of the operator through the operation unit 13. Here, the virtual image further includes a workpiece W as a processing target of the robot 30. Here, the workpiece W is, for example, supported by a placing table P, which is installed on the floor surface or the like.

Similarly, based on the operation of the operator through the operation unit 13, the teaching control device 11 generates a job program, which causes operation of the robot 30, from the virtual image and registers the job program on the job information DB 14.

The display unit 12 is a display device such as what is called a display. The operation unit 13 is an input device such as a computer mouse. Here, the operation unit 13 need not be constituted as hardware parts. The operation unit 13 may be, for example, software parts such as touch keys displayed on a touchscreen.

The job information DB 14 is a database to register: the job program, which causes operation of the robot 30; and the information related to teaching, for example, "teaching points" included in this job program.

Here, the teaching points are the information indicative of the target positions through which the respective joints of the robot 30 need to pass during reproducing operation of the robot 30. The teaching points are stored as, for example, pulse values of the respective encoders disposed in servo motors that drive the respective axes of the robot 30. The robot 30 operates based on the information of a plurality of teaching points. Accordingly, the job information DB 14 stores the plurality of teaching points in association with the individual motions (jobs) of the robot 30.

In other words, the job program of the robot 30 includes: the plurality of teaching point; an interpolation operation command between the respective teaching points; and combination information including an operation command to an end effector and the like. Here, to cause the reproducing operation of the robot 30, the robot 30 operates based on this job program.

The job information DB 14 is coupled to the robot control device 20 to allow information communication. The robot control device 20 is a controller that controls the actual operation of the robot 30. The robot control device 20 controls various operations of the robot 30 based on the job program registered on the job information DB 14. For example, the robot control device 20 controls the operation of the robot 30 in accordance with the teaching data generated by the teaching system 10 so as to process the workpiece W.

Here, FIG. 1 illustrates the case where the job information DB 14 (the teaching system 10) is coupled to the robot control device 20 as one example. However, the job information DB 14 (the teaching system 10) need not be coupled to the robot control device 20.

For example, the job program generated by the teaching system 10 may be saved in a storage (not illustrated) inside the robot control device 20 via an external storage device such as a Universal Serial Bus (USB) memory.

Here, in the example illustrated in FIG. 1, for ease of understanding, the job information DB 14 and the teaching control device 11 are configured separately. Instead, the job information DB 14 may be stored in a storage inside the teaching control device 11.

The following describes the configuration of the robot 30. The robot 30 includes a base portion 31, a first arm 32, a second arm 33, a flange portion 34, and an end effector 35.

The base portion 31 is secured to, for example, the floor surface, and supports the base end portion of the first arm 32 rotatably around an axis S (see the arrow around the axis S in the drawing) and rotatably around an axis L (see the arrow around the axis L in the drawing). The first arm 32 supports, in its tip portion, the base end portion of the second arm 33 rotatably around an axis U (see the arrow around the axis U in the drawing).

The tip portion of the second arm 33 is disposed rotatably around an axis R relative to the base end portion (see the arrow around the axis R in the drawing). The second arm 33 supports, in its tip portion, the base end portion of the flange portion 34 rotatably around an axis B (see the arrow around the axis B in the drawing). The flange portion 34 supports, in its tip portion, the base end portion of the end effector 35 rotatably around an axis T (see the arrow around the axis T in the drawing).

The respective joints of the robot 30 are driven by driving sources such as servo motors. The respective driving sources drive the respective joints of the robot 30 based on the operation command from the robot control device 20.

Here, the end effector 35 according to the embodiment is a spot welding gun. The end effector 35 includes a fixed arm 351 and a movable arm 352. The fixed arm 351 is secured to the main body portion of the end effector 35, and supports, in its tip portion, an electrode E1.

The movable arm 352 supports an electrode E2 facing the electrode E1. The movable arm 352 is disposed to allow a driving source (not illustrated) disposed in the end effector 35 to change the distance between the electrode E1 and the electrode E2. The end effector 35 moves the movable arm 352 to press and sandwich the workpiece W using the electrode E1 and the electrode E2. Furthermore, the end effector 35 performs spot welding on the pressed and sandwiched workpiece W. This end effector 35 is one example of a work tool.

Figure 2:
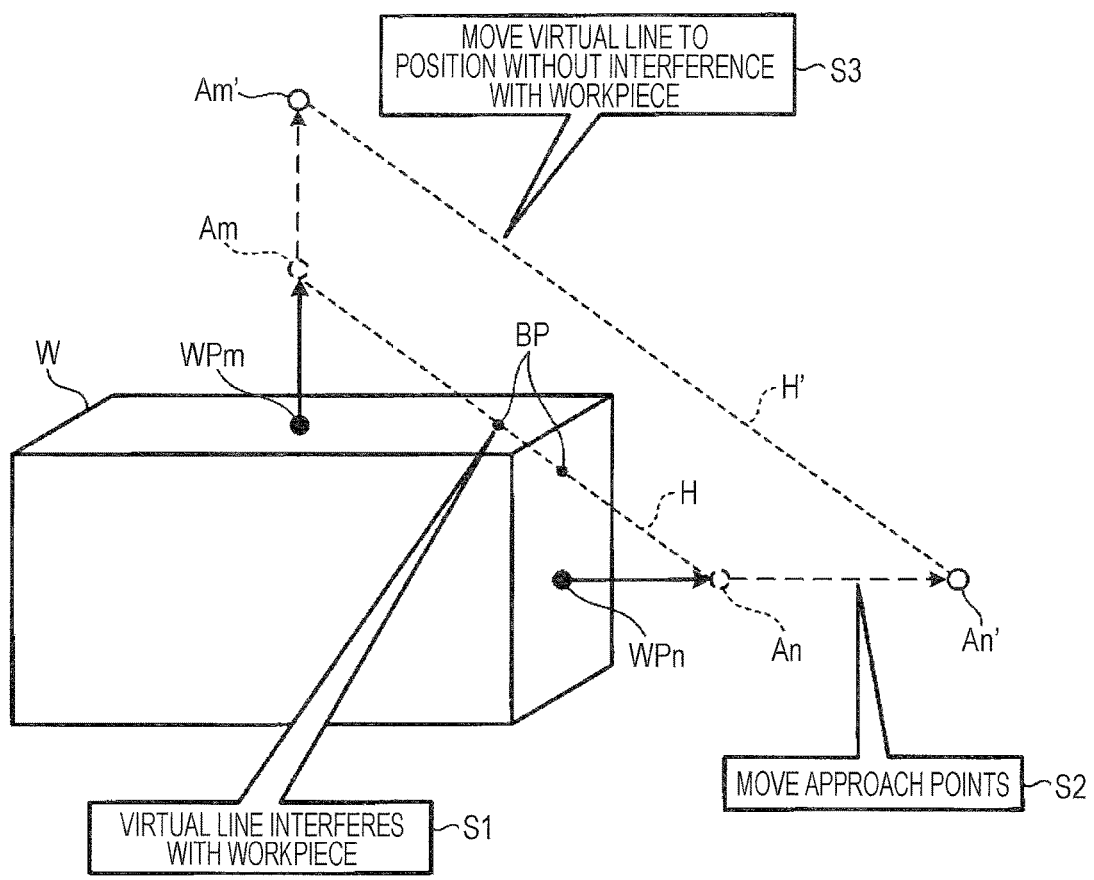
FIG. 2 is a pattern diagram illustrating a teaching method according to the embodiment.

Here, a description will be given of a teaching method according to the embodiment using FIG. 2. FIG. 2 is a pattern diagram illustrating the teaching method according to the embodiment.

The teaching method illustrated in FIG. 2 generates, for example, a path of the work tool for bringing the work tool such as the end effector 35 (see FIG. 1) to a plurality of working points WP disposed in the workpiece W while avoiding interference with the workpiece W.

Here, as illustrated in FIG. 2, a plurality of working points WP and approach points A are preliminarily set to the workpiece W according to the embodiment. In the example illustrated in FIG. 2, the workpiece W has two working points WPm and WPn, an approach point Am is set to the working point WPm, and an approach point An is set to the working point WPn. Here, the working points WP and the approach points A are examples of the above-described teaching points.

Here, the approach point A means the position to be the starting point and the ending point of the movement of the work tool approaching the working point WP. Accordingly, the work tool moves from the approach point A to the working point WP, and returns to the approach point A after the work on the working point WP. Hereinafter, the path from the approach point A to the working point WP is sometimes referred to as an "approach path." Furthermore, the distance of the approach path is sometimes referred to as an "approach distance." Furthermore, the direction from the approach point A toward the working point WP is sometimes referred to as an "approach direction."

The teaching method according to the embodiment generates a virtual line H, which connects the approach points A of the plurality of consecutive working points WP in the working order. Furthermore, the teaching data of the robot 30 (see FIG. 1) for moving the work tool along this virtual line H is generated.

Specifically, in FIG. 2, in the case where the work on the working point WPn is carried out subsequently to the work on the working point WPm, the virtual line H in which the work tool reaches the approach point An from the approach point Am is generated. However, interference with the workpiece W by the virtual line H causes interference with the workpiece W by the work tool. FIG. 2 illustrates both ends of the portion of the workpiece W to be interfered by the virtual line H as interference points BP. Here, for ease of understanding, FIG. 2 illustrates the virtual line H connecting the approach points A together in a straight line as one example.

Therefore, the teaching method according to the embodiment retreats the virtual line H to the position (the position that allows avoiding interference with the workpiece W) without interference with the workpiece W. This avoids the situation where the work tool interferes with the workpiece W. Hereinafter, the teaching method according to the embodiment will be described more specifically.

In the teaching method according to the embodiment, in the case where the virtual line H interferes with the workpiece W (see step S1 in FIG. 2), the approach points A are shifted parallel to the approach direction (that is, in the direction from the approach point A toward the working point WP or the direction from the working point WP toward the approach point A) (see step S2 in FIG. 2). Then, the virtual line H is moved to the position without interference with the workpiece W (see step S3 in FIG. 2).

Here, in this case, as illustrated in FIG. 2, it is preferred to shift the approach points A in the direction from the working point WP toward the approach point A. Accordingly, simply extending the approach distance allows generating the work tool's movement path that can avoid interference with the workpiece W. In FIG. 2, the respective approach points Am and An thus moved are illustrated as approach points Am' and An'. The virtual line H after movement is illustrated as a virtual line H'.

Here, the target for determine the interference with the virtual line H may be the workpiece W alone, and may include the workpiece W and an obstacle other than the workpiece W. In FIG. 2, for ease of understanding, the movement amounts of the approach points A (the virtual line H) are illustrated more exaggeratingly than the actual one.

Accordingly, the teaching method according to the embodiment retreats (moves) the virtual line H, which connects the adjacent approach points A together, to the position without interference with the workpiece W, and then moves the work tool along the virtual line H after movement.

This allows simply and easily generating movement path of the work tool reaching the plurality of working points WP while avoiding the interference with the workpiece W and the obstacle. Accordingly, this allows reducing the workload and the required time related to generation of the teaching data.

Here, in FIG. 2, a description has been given of the case where the approach points Am and An are moved as one example. Instead, any one of the approach points Am and An may be moved alone.

Figure 3:
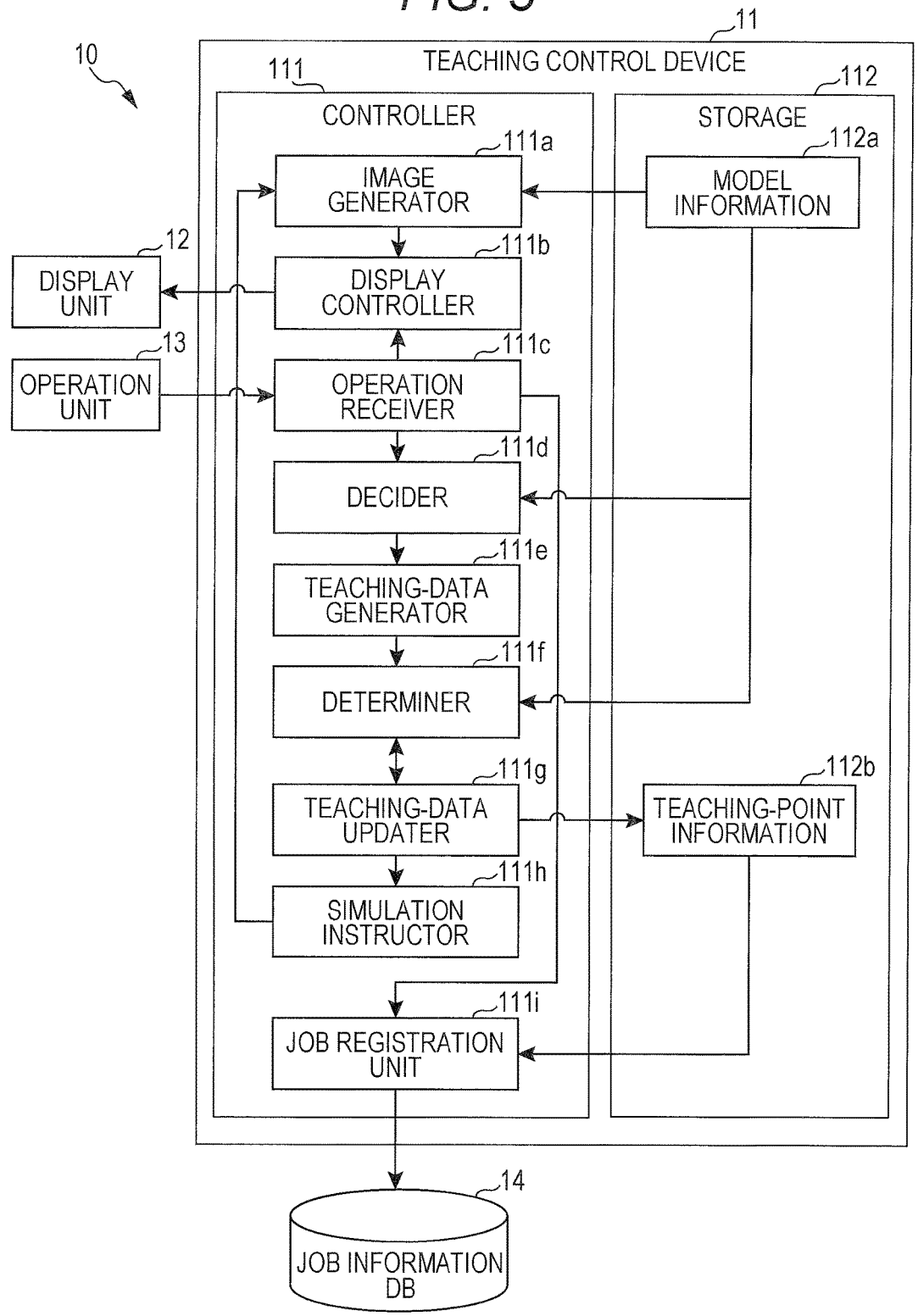
FIG. 3 is a block diagram illustrating the configuration of the teaching system according to the embodiment.

The following describes the configuration of the teaching system 10 according to the embodiment using FIG. 3. FIG. 3 is a block diagram illustrating the configuration of the teaching system 10 according to the embodiment. Here, in FIG. 3, only the components required for describing the teaching system 10 are illustrated, and the general components are omitted.

In the description using FIG. 3, the internal constitution of the teaching control device 11 will be mainly described. The descriptions of the display unit 12, the operation unit 13, and job information DB 14, which have already been illustrated in FIG. 1, might be simplified.

As illustrated in FIG. 3, the teaching control device 11 includes a controller 111 and a storage 112. The controller 111 includes an image generator 111a, a display controller 111b, an operation receiver 111c, a decider 111d, a teaching-data generator 111e, a determiner 111f, a teaching-data updater 111g, a simulation instructor 111h, and a job registration unit 111i. The storage 112 stores information including model information 112a and teaching-point information 112b.

Based on the model information 112a, the image generator 111a generates a virtual image including the robot 30 and the workpiece W. The model information 112a is information including drawing information, which is preliminarily defined for each type of the robot 30 and the workpiece W. Here, the model information 112a also includes drawing information of a peripheral object including an obstacle in addition to the drawing information of the robot 30 and the workpiece W. Furthermore, the model information 112a includes information related to the position of the working point WP on the workpiece W.

The image generator 111a outputs the generated virtual image to the display controller 111b. The display controller 111b displays the virtual image, which is received from the image generator 111a, on the display unit 12.

The operation receiver 111c receives the operator's input operation, which is input through the operation unit 13. In the case where the operator's input operation is related to teaching of the robot 30, the operation receiver 111c notifies the display controller 111b and/or the decider 111d about the received input operation.

The operation receiver 111c receives the setting operation of the approach point A. The detail of this point will be described later using FIG. 5. The location information of the set approach points A are notified to the teaching-data generator 111e.

In the case where the operator's input operation is the input operation giving an instruction of job registration, the operation receiver 111c notifies the job registration unit 111i about the received input operation. Here, the input operation giving the instruction of job registration is, for example, the operation for clicking operating parts such as a "REGISTER JOB" button displayed on the display unit 12.

The decider 111d decides the working order of the working points WP. The detail of this point will be described later using FIG. 7.

Based on the information of the approach points A from the operation receiver 111c, the teaching-data generator 111e generates the virtual line H. Then, the teaching-data generator 111e generates teaching data of the robot 30 and notifies the determiner 111f about the teaching data. This teaching data of the robot 30 is, for example, data for controlling the robot 30 such that the end effector 35 moves along the virtual line H to reach the working point WP in the working order decided by the decider 111*d*. That is, the teaching-data generator 111*e* generates the teaching data of the robot 30 such that the robot 30 moves the end effector 35 passing through the approach points A corresponding to the respective working points WP and thus the end effector 35 reaches and separates from the working point WP in the virtual environment including the end effector 35, the robot 30, and the workpiece W to which the plurality of working points WP are preliminarily set.

By reference to the model information 112*a*, the determiner 111*f* determines whether the virtual line H interferes with the workpiece W or the obstacle other than the workpiece W. Here, the determiner 111*f* notifies the teaching-data updater 111*g* about the determination result together with the teaching data.

In the case where the determiner 111*f* determines that the virtual line H interferes with the workpiece W or the obstacle, the teaching-data updater 111*g* updates the teaching data to retreat the virtual line H from the workpiece W. Furthermore, the teaching-data updater 111*g* stores the updated teaching data as the teaching-point information 112*b* in the storage 112. On the other hand, in the case where the determiner 111*f* determines that the virtual line H does not interfere with the workpiece W or the obstacle, the teaching-data updater 111*g* stores the teaching data relate to the virtual line H as the teaching-point information 112*b* in the storage 112 without update. Here, the detail of this point will be described later using FIG. 6A and later figures.

In the case where the teaching-data updater 111*g* receives the input operation giving an instruction of simulation operation via the operation receiver 111*c*, the teaching-data updater 111*g* notifies the simulation instructor 111*h* about the teaching data of the robot 30. The simulation instructor 111*h* notifies the image generator 111*a* about a simulation instruction for regenerating the virtual image of the robot 30 whose position and/or posture are changed corresponding to the contents of the teaching data notified from the teaching-data updater 111*g*.

The image generator 111*a* regenerates the virtual image including the robot 30 and the workpiece W based on the simulation instruction received from the simulation instructor 111*h*, and displays the virtual image on the display unit 12 via the display controller 111*b*. This displays the image of the simulation operation, which continuously changes, including the virtual image including the robot 30 and the workpiece W In the case where the job registration unit 111*i* receives the input operation giving the instruction of job registration from the operation receiver 111*c*, the job registration unit 111*i* generates a job program for causing the operation of the actual robot 30 based on the teaching-point information 112*b* and registers the job program to the job information DB 14.

The storage 112 is a storage device such as a hard disk drive and a non-volatile memory. The storage 112 stores the information including the model information 112*a* and the teaching-point information 112*b*. Here, the contents of the model information 112*a* and the teaching-point information 112*b* have been already described, and thus their descriptions are omitted here.

The following describes a sequence of processes executed by the respective processors of the operation receiver 111*c* to the teaching-data updater 111*g* described above in detail using FIGS. 4 to 8.

Figure 4:
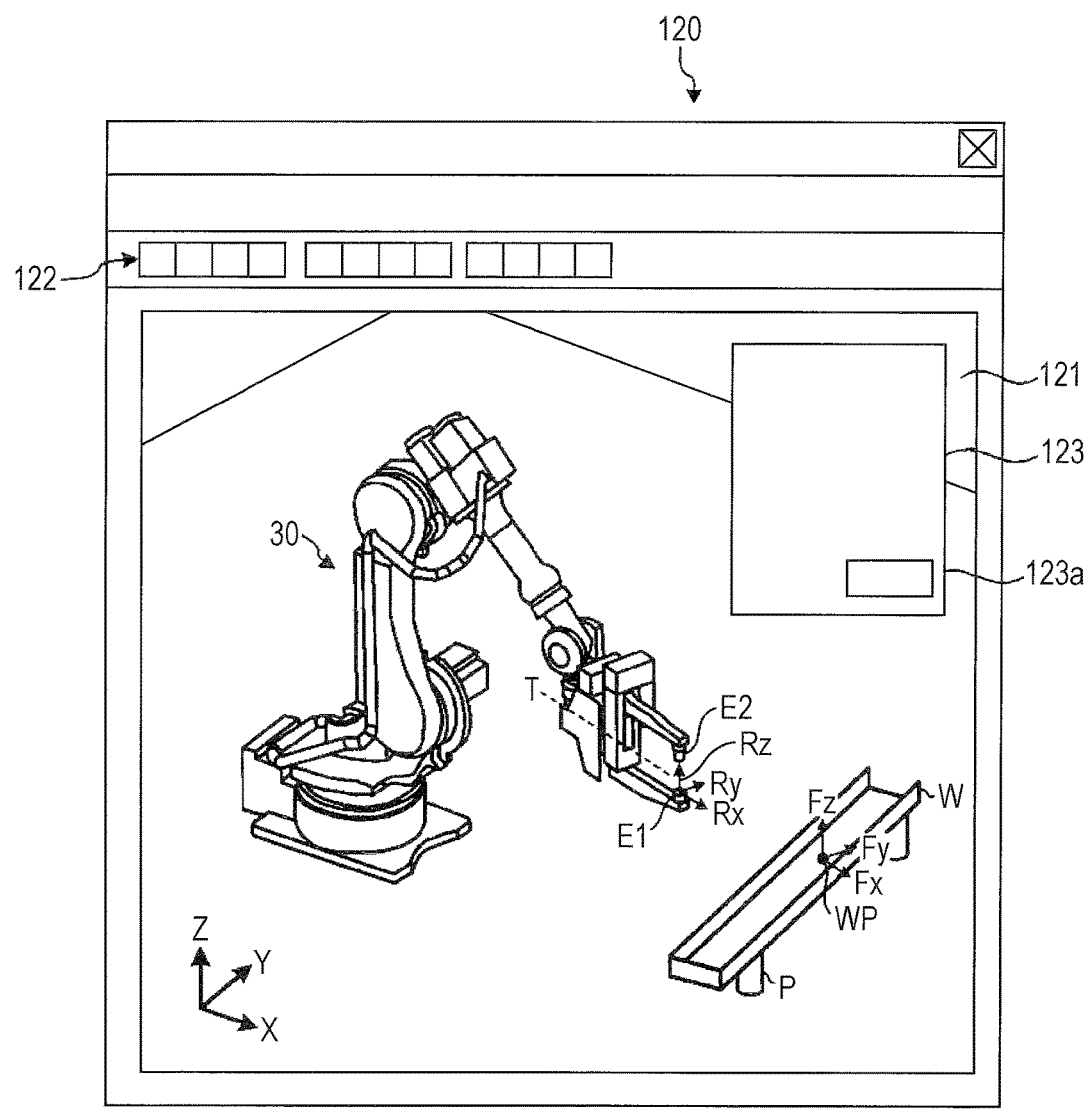
FIG. 4 is a pattern diagram illustrating one example of a virtual image displayed on a display unit.

Firstly, a description will be given of one example of a virtual image that is generated by the image generator 111*a* and displayed on the display unit 12 via the display controller 111*b* using FIG. 4. FIG. 4 is a pattern diagram illustrating one example of the virtual image displayed on the display unit 12. Here, the robot and the workpiece illustrated in FIG. 4 and later figures are on the virtual image displayed on the display unit 12. However, the respective reference numerals of "30" and "W" are given to the robot and the workpiece similarly to above, and then the description proceeds.

As illustrated in FIG. 4, the virtual image including the robot 30 and the workpiece W is displayed on a display window 120, which is one of the display areas of the display unit 12. Specifically, the virtual image is displayed in a virtual image area 121 on the display window 120. The display window 120 is a Graphical User Interface (GUI) widget including buttons 122, a dialog box 123, and the like.

Here, as illustrated in FIG. 4, the rectangular coordinate system is displayed in the lower left portion of the virtual image area 121. This rectangular coordinate system is the reference coordinate within the virtual image, and is the reference in the horizontal direction and the vertical directional. Specifically, the direction parallel to the XY plane specified by the X-axis and the Y-axis of the reference coordinate system is the horizontal direction. The direction parallel to the Z-axis of the reference coordinate system is the vertical direction. Hereinafter, this coordinate system is described as the "world coordinate system."

Hereinafter, in some cases, the positive direction of the X-axis in the world coordinate system is denoted as the "front side" of the robot 30, the negative direction of the X-axis is denoted as the "rear side," the positive direction of the Y-axis is denoted as the "left side", the negative direction of the Y-axis is denoted as the "right side," the positive direction of the Z-axis is denoted as the "above side," and the negative direction of the Z-axis is denoted as the "below side."

As illustrated in FIG. 4, at the tip of the electrode E1, an "R coordinate system" is displayed. The R coordinate system is the reference coordinate of the end effector 35. The R coordinate system according to the embodiment is a right-handed coordinate system determined such that an Rx-axis is parallel to the axis T and an Rz-axis is along the moving direction of the electrode E2. On the workpiece W, a "WP coordinate system" is displayed. The WP coordinate system is a right-handed coordinate system whose origin is the working point WP.

The end effector 35 carries out a predetermined work (such as spot welding) while matching the respective axes corresponding to the R coordinate system and the WP coordinate system in the working point WP. Specifically, the end effector 35 matches: the Rx-axis with an Fx-axis; an Ry-axis with an Fy-axis; and the Rz-axis with an Fz-axis, in the working point WP. Here, the Fz-axis according to the embodiment denotes the approaching direction (that is, the approach direction) of the end effector 35 in the working point WP. That is, the WP coordinate system specifies the posture of the end effector 35 in the working point WP, which is the origin of the WP coordinate system. The WP coordinate system is, for example, preliminarily set to all the working points WP.

The operator operates the GUI widget so as to give an instruction for operation to the teaching system 10. In accordance with the operator's operation instruction, the teaching system 10 can: drive the respective joints of the robot 30 as the virtual image on the display unit 12; change the viewpoint corresponding to the direction from which the virtual image is displayed; and scale the display image.

The teaching system 10 can obtain, by reverse kinematic calculation, the respective joint positions of the robot 30 to cause the end effector 35 to reach a specific point within the virtual image. Furthermore, the teaching system 10 can generate the virtual image of the robot 30 in the state where the end effector 35 has reached the specific point and display the virtual image on the display unit 12.

Furthermore, the teaching system 10 can read the teaching point and/or the job program, which are registered on the job information DB 14, in accordance with the instruction operation of the operator to display the virtual image of the robot 30 that has reached a specific teaching point. The teaching system 10 can also reproduce, on the display unit 12, a sequence of operations of the robot 30 by the job program.

Here, the "REGISTER JOB" button or the like described above may be disposed as, for example, a button 123a of the dialog box 123.

Figure 5:
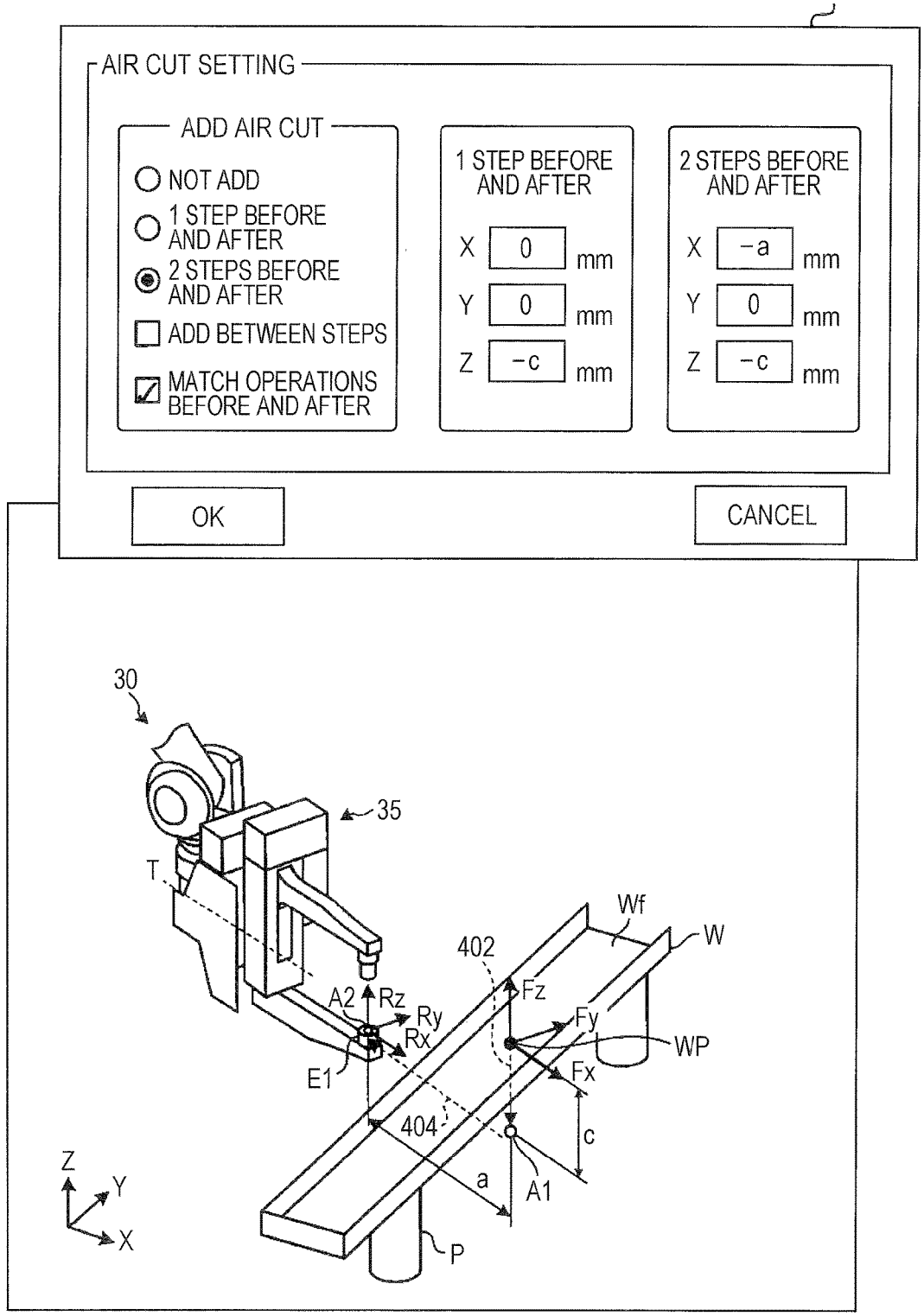
FIG. 5 is an explanatory view of an operation for setting approach points.

The following describes the operation for setting the approach points A by the operator using FIG. 5. FIG. 5 is an explanatory view of the operation for setting the approach points A. Here, FIG. 5 illustrates, as one example, the case where the working points WP as the setting targets of the approach points A are positioned on the inferior surface of a main wall Wf of the workpiece W.

As illustrated in FIG. 5, in the case where the approach points A are set, the dialog box 123 displays an operating parts group for air cut setting. The operator can set the air cut to the working points WP using the radio button within "ADD AIR CUT."

Here, the air cut means an operation path of the end effector 35 (the robot 30) connecting a plurality of the working points WP. In the air cut, the section where the end effector 35 decelerates and approaches or move away from the working point WP while avoiding the contact with the workpiece W and the peripheral obstacle corresponds to the above-described approach path.

Here, hereinafter, the path where the end effector 35 approaches the working point WP in the approach path of the end effector 35 is sometimes referred to as a "going-way." Furthermore, the path where the end effector 35 moves away from the working point WP in the approach path is sometimes referred to as a "returning-way."

The dialog box 123 displays "input boxes" for the X-value, the Y-value, and the Z-value for each "step before and after" selected using "ADD AIR CUT." The values in the input boxes correspond to the movement amounts in the positive direction from the state where the R coordinate system having the Rx (X)-axis, the Ry (Y)-axis, and the Rz (Z)-axis is matched with the WP coordinate system. The respective input boxes of "1 STEP BEFORE AND AFTER" allow inputs of X=0, Y=0, and Z=−c (c>0) as illustrated in FIG. 5 because the Fz-axis is the direction approaching the working point WP.

As just described, input in "1 STEP BEFORE AND AFTER" causes generation of an approach point A1 in the position apart from the working point WP by a distance c in the negative direction of the Fz-axis (see an arrow 402 in FIG. 5). Here, in the case where the radio button of "1 STEP BEFORE AND AFTER" is selected, "2 STEPS BEFORE AND AFTER" is not displayed. Accordingly, in this case, input is completed in the phase where "1 STEP BEFORE AND AFTER" has been input. Hereinafter, the direction from the approach point A1 toward the working point WP is sometimes referred to as a "first approach direction."

On the other hand, for example, in the case where an inserting/retracting operation of the end effector 35 to/from the workpiece W is used, the radio button of "2 STEPS BEFORE AND AFTER" is selected. In this case, as illustrated in FIG. 5, "1 STEP BEFORE AND AFTER" and "2 STEPS BEFORE AND AFTER" are displayed. The respective input boxes of "2 STEPS BEFORE AND AFTER" allow inputs of any values. In this embodiment, it is preferred that the Z-value be equal to that of "1 STEP BEFORE AND AFTER," the X-value be −a (a>0), and the Y-value be 0.

As just described, input in "2 STEPS BEFORE AND AFTER" allows narrowing down to one parameter related to movement to an approach point A2 described later using FIG. 9A and the like. Then, the approach point A2 is generated in the position apart from the approach point A1 by the distance a in the negative direction of the Fx-axis (see an arrow 404 in FIG. 5). Here, the direction from the approach point A2 toward A1 is sometimes referred to as a "second approach direction" below.

After the inputs in "1 STEP BEFORE AND AFTER" and "2 STEPS BEFORE AND AFTER," an "OK" button is clicked to set the approach points A1 and A2. Here, the check box of "ADD BETWEEN STEPS" will be described later using FIG. 6B.

In the case where the check box of "MATCH OPERATIONS BEFORE AND AFTER" is turned ON, the end effector 35 takes the identical path on the going-way and the returning-way of the approach path. On the other hand, in the case where the check box of "MATCH OPERATIONS BEFORE AND AFTER" is turned OFF, the case where the going-way and the returning-way of the approach path are mutually different is allowed and the movement path of the end effector 35 is shortened. The detail of this point will be described later using FIG. 6C.

The operation of the end effector 35 in the air cut can include any count of steps before and after. Accordingly, the inside of "ADD AIR CUT" is not limited to the example illustrated in FIG. 5, and a radio button can be displayed to allow selection of any count of steps before and after corresponding to the shape or the like of the end effector 35 and/or the workpiece W. In the case where the air cut need not be set, the radio button of "NOT ADD" is selected. Then, setting related to the air cut using this dialog box 123 becomes the initial setting for the positional relationship between the approach points A corresponding to all the working points WP related to the job of the robot 30.

The following describes one example of the teaching method according to the embodiment using FIGS. 6A to 6D. FIGS. 6A to 6D are explanatory views (first) to (fourth) for describing a changing method of the positions of the approach points.

Figure 6A:
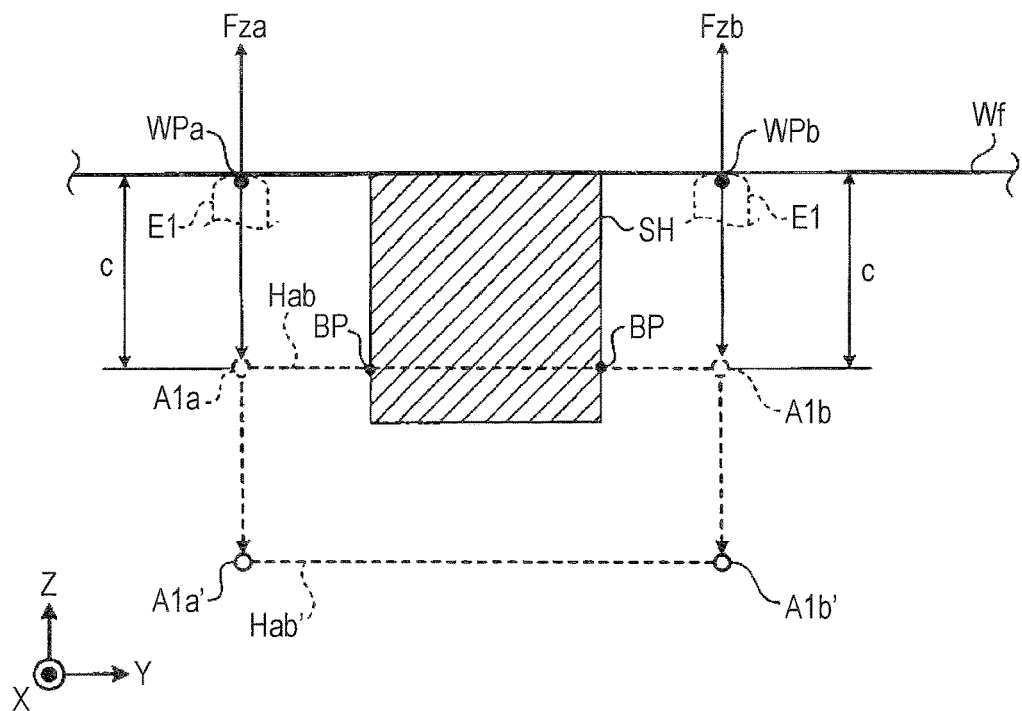
FIG. 6A is an explanatory view (first) for describing a changing method of the positions of the approach points.
Figure 6B:
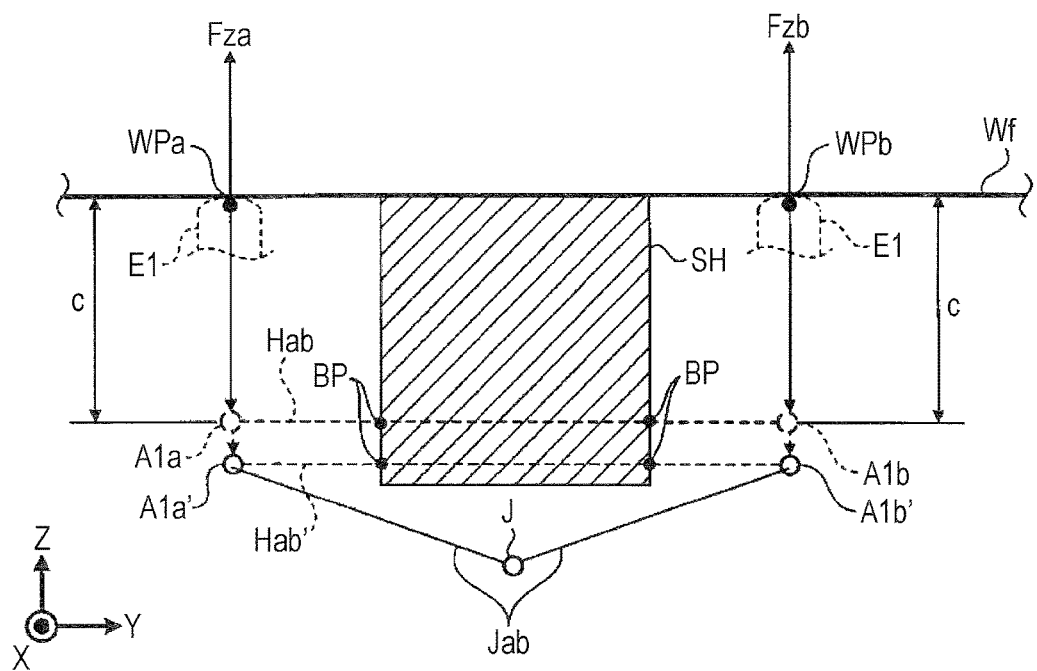
FIG. 6B is an explanatory view (second) for describing the changing method of the positions of the approach points.
Figure 6C:
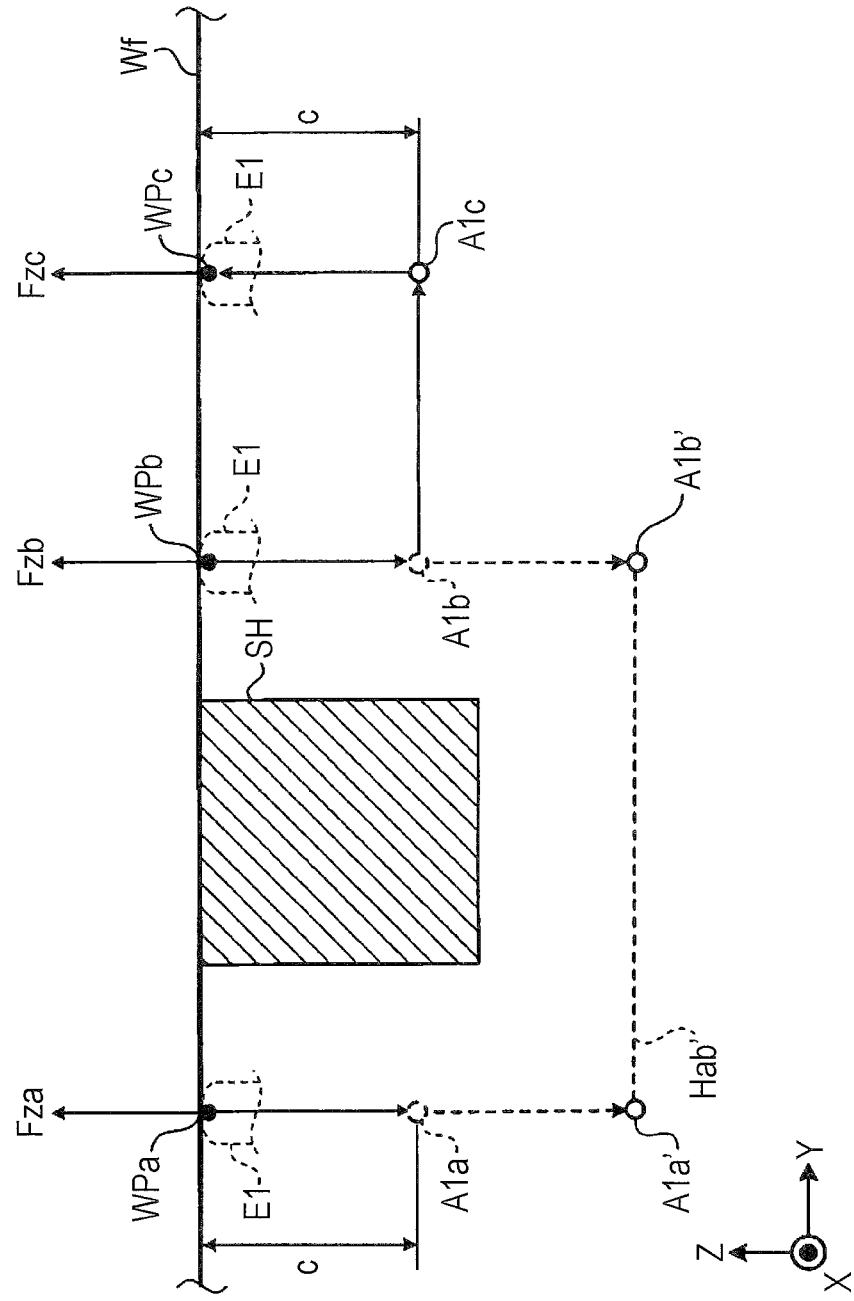
FIG. 6C is an explanatory view (third) for describing the changing method of the positions of the approach points.

Hereinafter, as one example, a description will be given of the case where the teaching data of the robot 30 moving from a working point WPa to WPb disposed on the inferior surface of the main wall Wf of the workpiece W illustrated in FIG. 5 is generated using above-described "1 STEP BEFORE AND AFTER." Here, FIGS. 6A to 6C illustrate the electrode E1 positioned in the working points WPa, WPb, and WPc by dotted lines.

As already described using FIG. 5, in accordance with air cut setting by using the dialog box 123, the teaching-data generator 111e (see FIG. 3) generates the approach point A1 in the position apart from the working point WP by the distance c in the negative direction of the Fz-axis. FIG. 6A illustrates this approach point A1 as approach points A1a and A1b.

The teaching-data generator 111e generates a virtual line Hab connecting the approach point A1a to the approach point A1b. Then, the determiner 111f (see FIG. 3) determines whether, for example, the virtual line Hab interferes with an obstacle SH present between the working point WPa and WPb. FIG. 6A illustrates the case where the virtual line Hab interferes with the obstacle SH. FIG. 6A illustrates both ends of the portion interfering with the obstacle SH in the virtual line Hab as interference points BP. Here, examples of the obstacle SH can include the placing table P, the fixing jig (not illustrated) for the workpiece W, and the like. The obstacle SH may be a part of the workpiece W.

In this case, for example, the teaching-data updater 111g moves the approach point A1a in the negative direction of the Fza-axis and moves the approach point A1b in the negative direction of the Fzb-axis (see approach points A1a' and A1b' in FIG. 6A). Here, these movements correspond to the movements of the end effector 35 positioned in the approach point A1a and the point A1b in the negative direction of the Rz-axis (see FIG. 5).

Here, the movement amounts of the approach points A may be preliminarily determined as, for example, 10% of the approach distance. The teaching-data updater 111g may preliminarily store the movement amounts of the approach points A in the storage 112. The teaching-data updater 111g may be configured to change the setting values of the movement amounts of the approach points A using a dialog box different from that illustrated in FIG. 5.

Accordingly, the virtual line Hab retreats to the position without interference with the obstacle SH (see the virtual line Hab' in FIG. 6A). Then, the determiner 111f determines whether the virtual line Hab' interferes with the obstacle SH. In the case where the virtual line Hab' does not interfere with the obstacle SH, the teaching-data updater 111g updates the teaching data of the robot 30 for the path of the end effector 35 (the electrode E1) such that the end effector 35 (the electrode E1) moves along the virtual line Hab' so as to move from the working point WPa to WPb.

Here, as illustrated in FIG. 6B, in addition to the movements of the approach points A1a and A1b, the teaching-data updater 111g may generate a passing point J in a position farther from the workpiece W (alternatively, the workpiece W and the obstacle) than the virtual line Hab'. In this case, the teaching-data updater 111g generates a virtual line Jab connecting the approach point A1a' and A1b' via the passing point J. The determiner 111f determines whether the virtual line Jab interferes with the obstacle SH. In the case where the virtual line Jab does not interfere with the obstacle SH, the teaching-data updater 111g generates (updates) the teaching data of the robot 30 such that the end effector 35 moves along the virtual line Jab.

As just described, in the case where the teaching-data updater 111g generates the passing point J, the operator sets the check box (see FIG. 5) of "ADD BETWEEN STEPS" in the air cut setting to ON. Here, the virtual line Hab' in this case may interfere with the workpiece W (see the interference points BP in FIG. 6B). Furthermore, the count of the passing points J is not limited to one, but may be plural.

The respective movement amounts of the approach points A1a and A1b may be identical or different. Only any one of the approach points A1a and A1b may be moved.

Turning OFF the check box of "MATCH OPERATIONS BEFORE AND AFTER" (see FIG. 5) allows further shortening the operation path of the robot 30. Hereinafter, the detail of this point will be described later using FIG. 6C. In the example illustrated in FIG. 6C, a working point WPc illustrated in this drawing is additionally disposed on the inferior surface of the main wall Wf of the workpiece W. The following describes, as one example, the case where the end effector 35 moves from the working point WPb illustrated in FIG. 6A to WPc.

In the case where the check box of "MATCH OPERATIONS BEFORE AND AFTER" is turned ON, the going-way and the returning-way are identical in the approach path of the end effector 35. Accordingly, the end effector 35 reaches the working point WPb from the approach point A1b' illustrated in FIG. 6C and then returns again to the approach point A1b'. Then, the end effector 35 moves from the approach point A1b' to an approach point A1c disposed in the working point WPc. Accordingly, in the case where the going-way and the returning-way may be identical, turning on the check box of "MATCH OPERATIONS BEFORE AND AFTER" allows reducing the workload and the required time related to generation of the teaching data of the robot 30.

On the other hand, in the case where the check box of "MATCH OPERATIONS BEFORE AND AFTER" is turned OFF, the going-way and the returning-way are allowed to be different in the approach path of the end effector 35. Accordingly, the end effector 35 reaches the working point WPb from the approach point A1b' illustrated in FIG. 6C and then returns to, for example, the approach point A1b.

Then, the end effector 35 moves from the approach point A1b to the approach point A1c disposed in the working point WPc. This ensures a short movement distance of the end effector 35 compared with the case of movement from the approach point A1b' to A1c. Accordingly, the operation path of the robot 30 can be shortened.

Here, the OFF state of the check box of "MATCH OPERATIONS BEFORE AND AFTER" only allows the state where the going-way and the returning-way of the approach path are mutually different. Accordingly, there may be the working point WP of the workpiece W such that the going-way and the returning-way are identical in the approach path of the end effector 35.

In the case where the determiner 111f determines that the end effector 35 moving between the working point WP and the approach point A interferes with the workpiece W or the obstacle SH, the teaching-data updater 111g moves the approach points A to separate the end effector 35 from the obstacle SH.

Figure 6D:
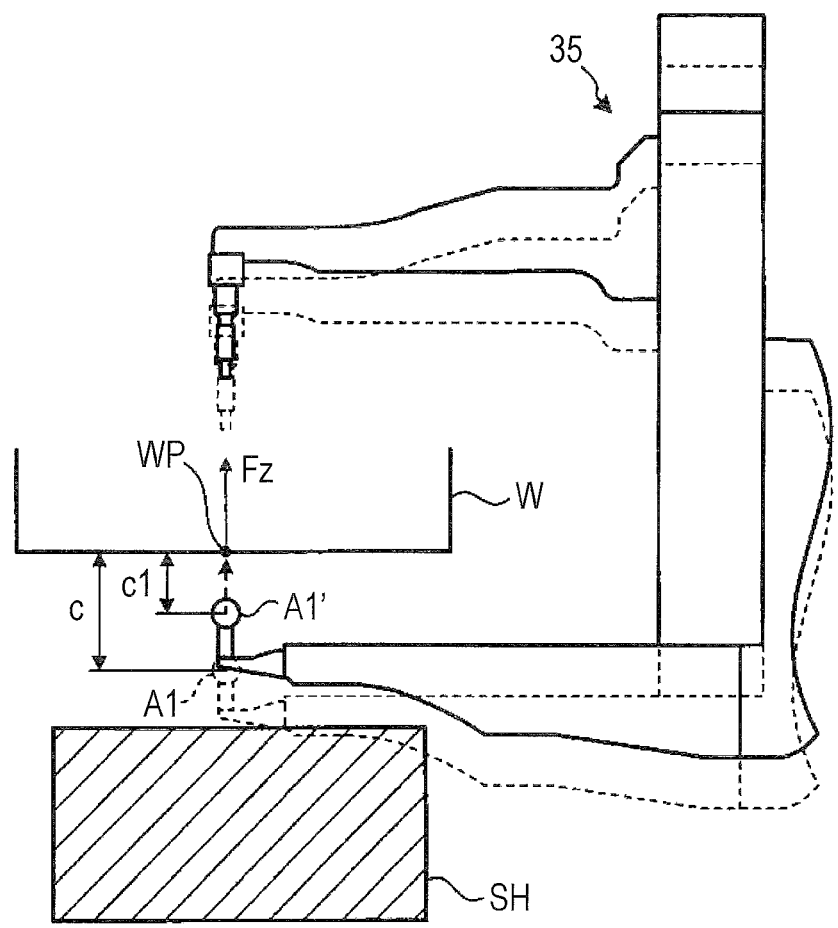
FIG. 6D is an explanatory view (fourth) for describing the changing method of the positions of the approach points.

FIG. 6D illustrates one example of the end effector 35 that is positioned in the approach point A1 and interferes with the obstacle SH by dotted lines. In this case, for example, the teaching-data updater 111g moves the approach point A1 closer to the working point WP along the first approach direction. FIG. 6D illustrates the approach point A1 after the movement as an approach point A1', and illustrates the approach distance from the approach point A1' to the working point WP as a distance c1.

Here, the movement amounts of the approach points A may be preliminarily determined as, for example, 10% of the approach distance. The teaching-data updater 111g may preliminarily store the movement amounts of the approach points A in the storage 112. The teaching-data updater 111g may be configured to change the setting values of the movement amounts of the approach points A using a dialog box different from that illustrated in FIG. 5.

As just described, the teaching method according to the embodiment generates the virtual line H connecting the approach points A together, and determines whether this virtual line H interferes with the workpiece W or the obstacle SH.

In the case where the virtual line H interferes with the workpiece W or the obstacle SH, the approach points A set using the dialog box 123 (see FIG. 5) are automatically moved to regenerate the virtual line H. Accordingly, the virtual line H is retreated from the workpiece W and the obstacle SH.

This allows avoiding interference with the workpiece W and the obstacle SH by the end effector 35 and easily and automatically generating the teaching data for controlling the work (operation) of the robot 30. Thus, the teaching system 10 according to the embodiment allows reducing the workload and the required time related to generation of the teaching data.

The teaching method according to the embodiment moves the approach points A along the direction of one axis (such as the Rz-axis) of the R coordinate system (see FIG. 5. Accordingly, changing one parameter allows generating the teaching data of the robot 30 to avoid the interference with the workpiece W and the obstacle SH by the end effector 35. This allows reducing the processing load of the teaching control device 11 (see FIG. 1) and more simply and easily generating the teaching data of the robot 30.

Figure 7:
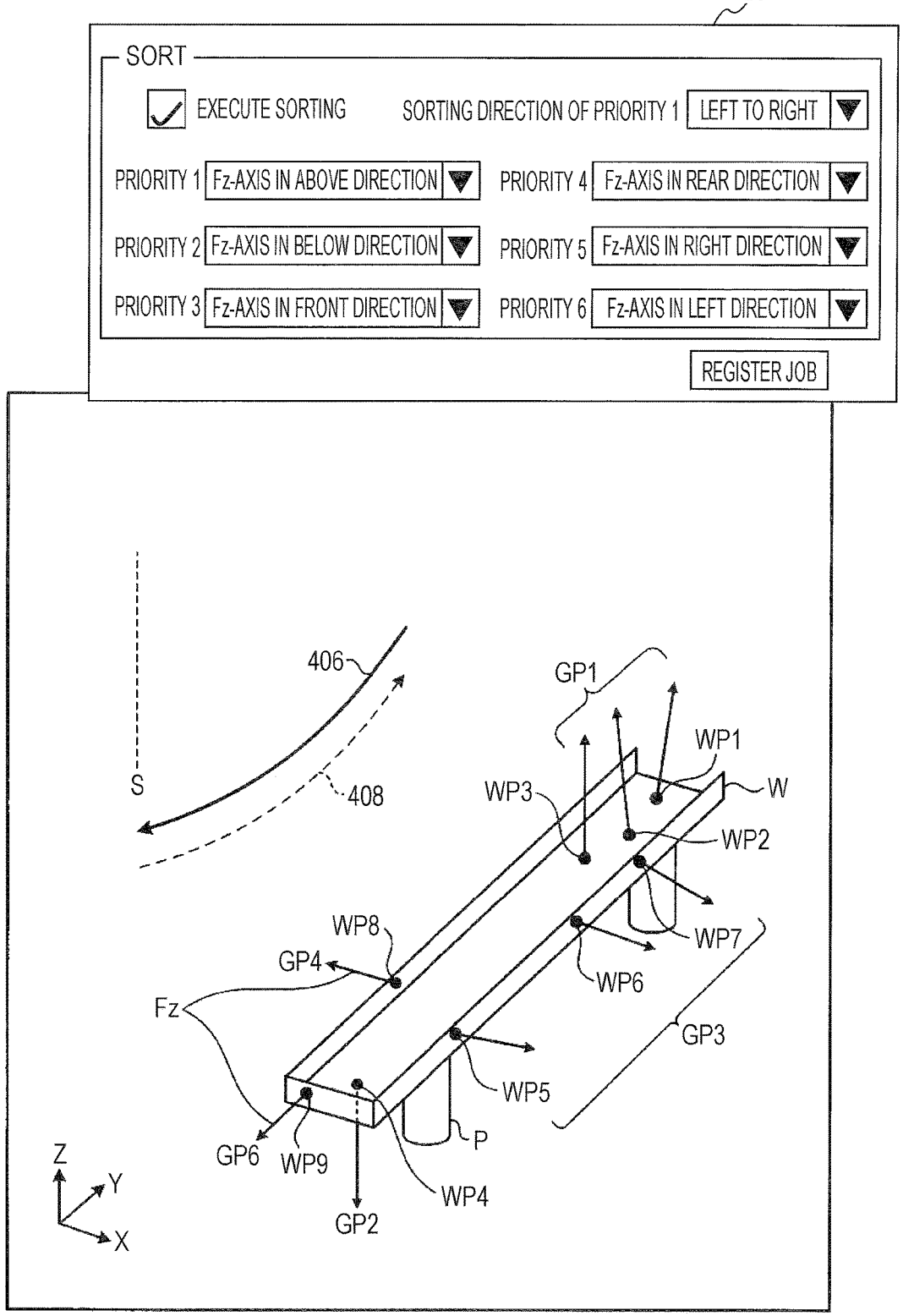
FIG. 7 is an explanatory view of an operation for deciding the working orders of working points.

Incidentally, based on the direction (the approach direction in this example) of the Fz-axis (see FIG. 4), the decider 111d (see FIG. 3) decides the working order by grouping the working points WP. Hereinafter, the detail of this point will be described later using FIG. 7. FIG. 7 is an explanatory view of an operation for deciding the working orders of the working points WP.

As illustrated in FIG. 7, in the case where the working orders of the working points WP are decided, the dialog box 123 displays the operating parts group for deciding the working orders. Here, in the case where the check box of "EXECUTE SORTING" in "SORT" as one of the operating parts is turned ON, grouping of the working points WP and decision of the working orders can be made by the method described below. Here, "SORT" in this embodiment is, for example, the process for arranging the working orders of the working points WP in accordance with a certain factor such as the direction of the Fz-axis in the working point WP.

Regarding "SORT," for example, selection boxes of Priority 1 to Priority 6 are displayed. The selection box allows selecting the direction of the Fz-axis in the WP coordinate system from a total of six directions of above, below, front, rear, left, and right. FIG. 7 illustrates, as one example, the case where the above, below, front, rear, right, and left directions of the Fz-axis correspond to Priority 1 to Priority 6 in ascending order of the given numbers. The decider 111d (see FIG. 3) groups the working points WP based on the directions of the respective Fz-axes of the working points WP.

Specifically, for example, the decider 111d extracts the working point WP having the Fz-axis in the above direction, that is, approximately parallel to the positive direction of the Z-axis in the world coordinate system as a group GP1 of "PRIORITY 1." The decider 111d also extracts the working points WP in accordance with the respective directions corresponding to a groups GP2 to a groups GP6 corresponding to Priority 2 to Priority 6.

Here, in this extraction of the working points WP, to reduce the posture change of the robot 30 during the reproducing operation, the working point WP that has the Fz-axis forming an angle equal to or less than ±20 degree with respect to the direction as the reference in one group GP is preferred to be included in that group GP. To extract the working points WP without missing, the working point WP that has the Fz-axis forming an angle equal to or less than ±45 degrees with respect to the direction as the reference in one group GP is preferred to be included in that group GP.

The teaching-data generator 111e decides the working orders for each group GP in accordance with the priority order (that is, the given number given to "PRIORITY") of the group GP. The teaching-data generator 111e generates the teaching data of the robot 30 (see FIG. 1) in accordance with the decided working orders.

As just described, grouping the working points WP allows the robot 30 to work on the working point WP within the respective groups GP while having only a small posture change. Accordingly, reducing the posture change related to the work in the robot 30 allows shortening the work time.

Here, for convenience of explanation, in FIG. 7, the group including only one working point WP is also illustrated as the group GP (see groups GP2, GP4, and GP6 in FIG. 7). In the working point WP (Priority 5) corresponding to the Fz-axis in the right direction, the appropriate working point WP does not exist. In this case, the generation of the group GP related to Priority 5 is cancelled.

The decider 111d (see FIG. 3) also decides the working orders of the working points WP within the respective groups GP. Specifically, the working orders of the working points WP in the respective groups GP1 are decided such that the rotation direction of the axis S in the robot 30 becomes a certain direction selected by the selection box of "SORTING DIRECTION OF PRIORITY 1." In the example illustrated in FIG. 7, as "SORTING DIRECTION OF PRIORITY 1," "LEFT TO RIGHT" is selected (see an arrow 406 in FIG. 7).

As just described, the respective working orders of the working points WP in the group GP1 are decided based on the rotation direction of the axis S in the robot 30 (see FIG. 1). The reason for the above is because the axis S is the axis on the most base end side of the robot 30, the load weight of the axis S is larger than those of the other axes (that is, the axis L, the axis U, the axis R, the axis B, and the axis T), and the rotation speed of the axis S is small. Accordingly, the working orders of the working points WP can be set to the orders that reduce the count of changes in rotation direction of the axis S, so as to shorten the work time.

In this case, the rotation direction of the axis S in the group GP2 and later groups are appropriately decided based on the position of the working point WP (see a working point WP3 in FIG. 7) in the last working order among the working points WP belonging to the group GP1.

For example, in FIG. 7, the robot 30 works on the working point WP3 as the last working point in the group GP1 and then works on a working point WP4 in the group GP2. Furthermore, the robot 30 works on a working point WP5 closest to the working point WP4 among the working points WP included in the group GP3. In this case, the robot 30 works on the working point WP5 to a working point WP7 in the group GP3 while rotating the axis S from the right to the left (see an arrow 408 in FIG. 7). FIG. 7 illustrates a working point WP1 to a working point WP9 to which the working orders thus decided are given as the given numbers of the working points WP.

Deciding the working orders of the working points WP as just described allows reducing the rotation amount of the axis S in the robot 30. Accordingly, the time spent on the work of the robot 30 can be further shortened.

The teaching data of the robot 30 is generated by the teaching-data generator 111e (see FIG. 3) by clicking a "GENERATE JOB" button in the dialog box 123. The teaching data of the robot 30 is updated by the teaching-data updater 111g through the determination by the determiner 111f.

Here, in FIG. 7, as one example, the case where the working points WP are divided into six groups has been described. However, the count of groups of the working points WP is not limited to six. The working points WP may be divided into any count of groups. For example, the workpiece W might include only the working points WP having the Fz-axis in the above or below direction in the main wall Wf (see FIG. 5). In this case, the working points WP are divided into two groups, that is, the group having the Fz-axis in the above direction as the reference and the group having the Fz-axis in the below direction as the reference.

The following describes the procedure for performing the teaching method according to the embodiment in the teaching system 10 using FIG. 8. FIG. 8 is a flowchart illustrating the procedure for performing the teaching method according to the embodiment. Here, in FIG. 8, as one example, a description will be given of the case where one approach point A is disposed for one working point WP.

As illustrated in FIG. 8, the operator sets the approach point A to the working point WP (in step S101, see FIG. 5). The decider 111d groups the working points WP based on the approach direction toward the working point WP, and sort the groups (in step S102). Then, the decider 111d decides the working orders of the working points WP based on the approach directions (in step S103, see FIG. 7).

Based on the working orders of the working points WP, the teaching-data generator 111e generates the teaching data of the robot 30 for the path of the work tool (the end effector 35) including the virtual line H, which connects the approach points A of the two consecutive working points WP in the working order (in step S104). The determiner 111f determines whether the virtual line H interferes with the workpiece W or the obstacle SH other than the workpiece W (in step S105).

In the case where the virtual line H interferes with the workpiece W or the obstacle SH (Yes in step S105), the teaching-data updater 111g changes the positions of the approach points A (in step S106, see FIGS. 6B to 6C). Subsequently, the process in step S105 and later processes are repeated. In the case where the virtual line H does not interfere with the workpiece W or the obstacle SH (No in step S105), the process in step S107 and later processes proceed.

Subsequently, the determiner 111f determines whether the work tool (the end effector 35) positioned in the approach path, that is, the work tool moving between the working point WP and the approach point A interferes with the workpiece W or the obstacle SH (in step S107). In the case where the work tool interferes with the workpiece W or the obstacle SH (Yes in step S107), the teaching-data updater 111g changes the positions of the approach points A (in step S108, see FIG. 6D). Subsequently, the process in step S105 and later processes are repeated In the case where the work tool interferes with the workpiece W and the obstacle SH (No in step S107), the teaching-data updater 111g updates the teaching data (in step S109) and terminates the process.

Here, in step S106 and step S108, the determiner 111f repeats determination to reduce the movement amount of the approach point A so as to reduce the final movement amount of the approach point A.

Incidentally, a description has been given of the case where one approach point A is set for one working point WP so far. However, the count of approach points A corresponding to one working point WP is not limited to one, but may be decided as any count corresponding to, for example, the shape of the workpiece W or the work tool and/or the mode of the work on the working point WP.

Therefore, the following describes a teaching method according to a modification (first), as one example, in the case where two approach points A is set for one working point WP in detail using FIGS. 9A to 9D. FIGS. 9A to 9D are explanatory views (first) to (fourth) for describing a changing method of the positions of approach points A according to the modification (first). Here, in FIGS. 9A to 9C, as one example, a description will be given of the case where the end effector 35 moves from the working point WP3 to the working point WP4 illustrated in FIG. 7. Further, in FIG. 9D, as one example, a description will be given of the case where the end effector 35 moves from the working point WP4 to the working point WP5.

Here, FIGS. 9A to 9D illustrate the end effector 35 positioned in approach points A23 (A23') and A24 (A24') by dotted lines. In FIGS. 9A to 9D, the given numbers corresponding to the working points WP are given to the respective axes in the WP coordinate systems corresponding to the working points WP3 to WP5. For example, the respective axes in the WP coordinate system of the working point WP3 are an Fx3-axis, an Fy3-axis, and an Fz3-axis. The same applies to the approach points A1 and A2. The setting methods of the approach points A1 and A2 have been described in FIG. 5, and thus their descriptions are omitted here.

Firstly, a description will be given of the robot 30's teaching data generated by the teaching-data generator 111e (see FIG. 3) using FIG. 9A. Here, in FIG. 9A, both the distance from an approach point A13 to the working point WP3 and the distance from an approach point A14 to the working point WP4 are illustrated as the distances c (see FIG. 5). Both the distance from the approach point A13 to A23 and the distance from the approach point A14 to A24 are illustrated as the distances a (see FIG. 5).

Figure 9A:
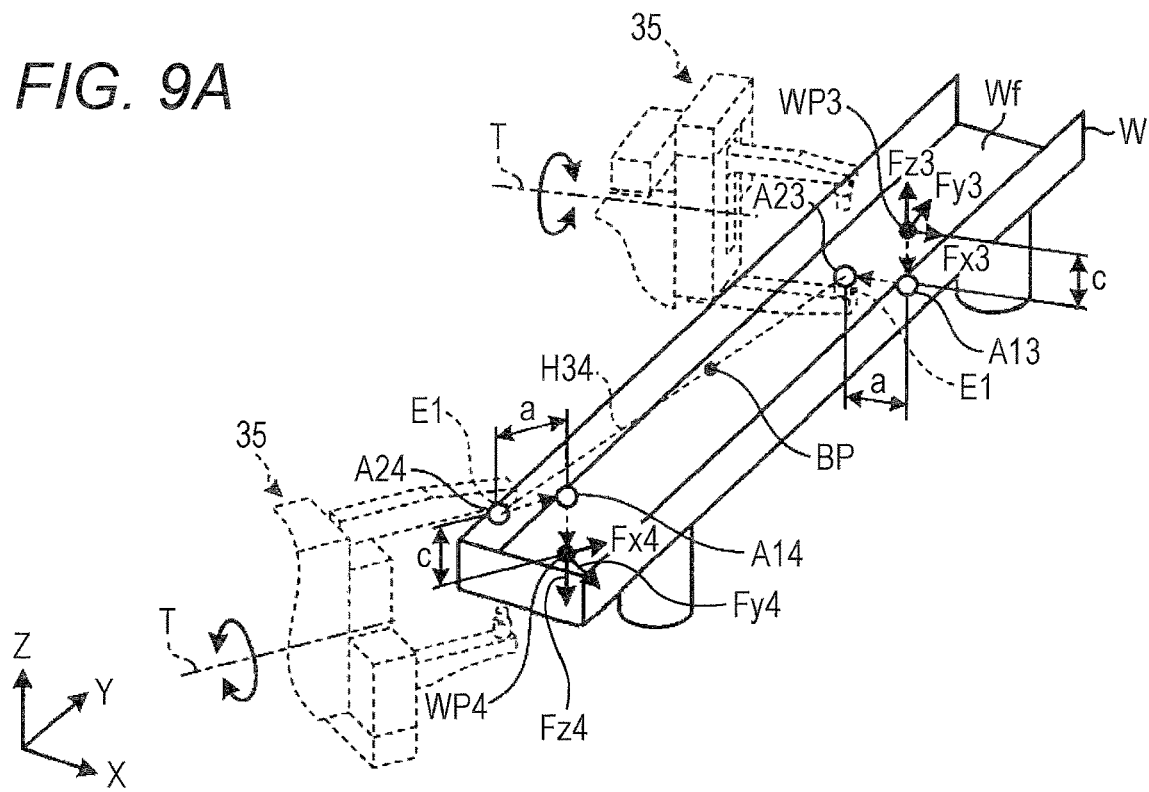
FIG. 9A is an explanatory view (first) for describing a changing method of the positions of the approach points according to a modification (first)

As illustrated in FIG. 9A, the teaching-data generator 111e generates the teaching data of the robot 30 such that the end effector 35 reach the working point WP4 from the working point WP3 via the approach points A13, A23, A24, and A14 in this order (see the dotted lines in FIG. 9A). Here, in the state illustrated in FIG. 9A, a virtual line H34 connecting the approach points A23 and A24 interferes with the workpiece W in the interference point BP.

Figure 9B:
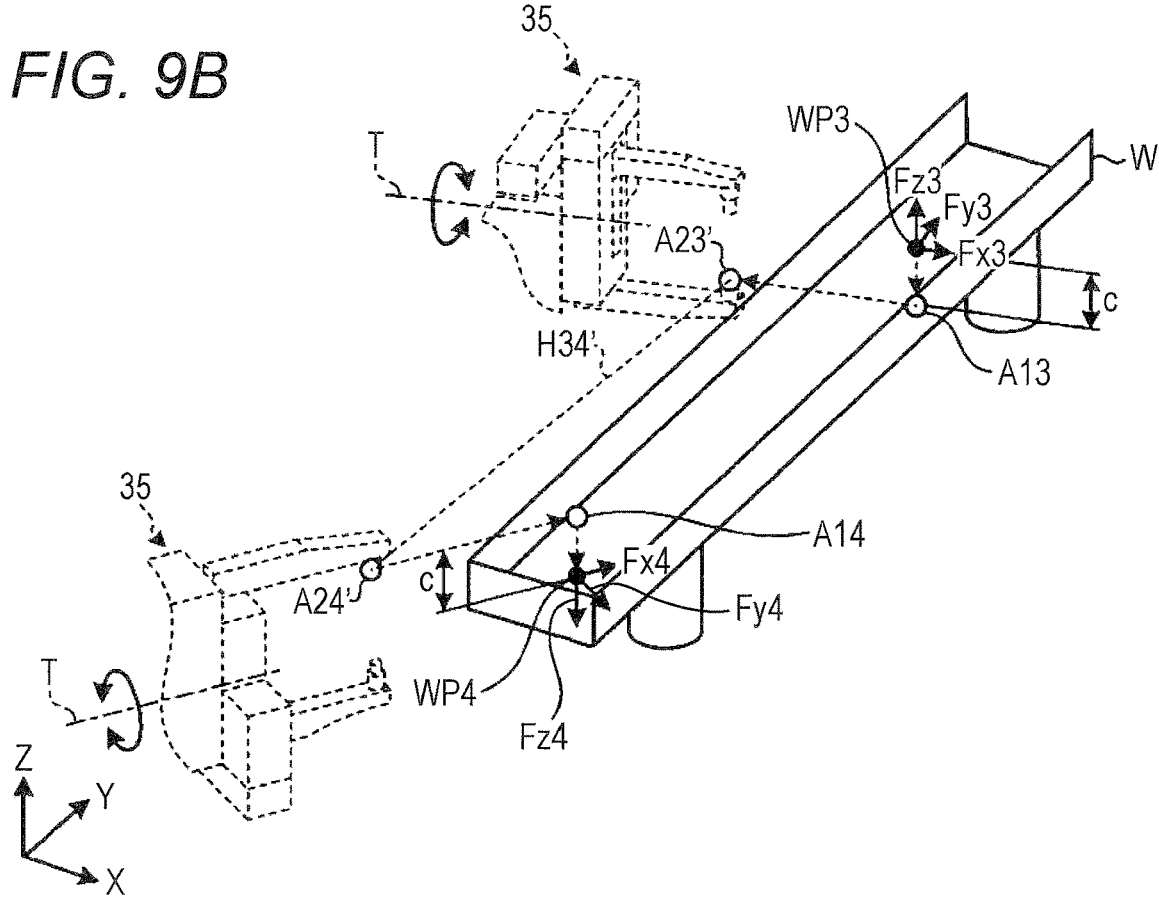
FIG. 9B is an explanatory view (second) for describing the changing method of the positions of the approach points according to the modification (first)

In this case, for example, the teaching-data updater 111g moves 'the approach point A23 in the negative direction of the Fx3-axis and moves the approach point A24 in the negative direction of the Fx4-axis (see approach points A23' and A24' in FIG. 9B). Here, these movements correspond to the movements of the end effector 35 positioned in the approach point A23 and the point A24 in the negative direction of the Rx-axis (see FIG. 5).

Here, the movement amounts of the approach points A may be preliminarily determined as, for example, 10% of the approach distance. The teaching-data updater 111g may preliminarily store the movement amounts of the approach points A in the storage 112. The teaching-data updater 111g may be configured to change the setting values of the movement amounts of the approach points A using a dialog box different from that illustrated in FIG. 5.

Accordingly, the virtual line H34 retreats to the position without interference with the workpiece W (see the virtual line H34' in FIG. 9B). Then, the determiner 111f determines whether the virtual line H34' interferes with the workpiece W. In the case where the virtual line H34' does not interfere with the workpiece W, the teaching-data updater 111g generates (updates) the teaching data of the robot 30 for the path of the end effector 35 (the electrode E1) such that the end effector 35 (the electrode E1) moves along the virtual line H34' so as to move from the working point WP3 to WP4.

Here, in FIG. 9B, as one example, a description has been given of the case where the approach points A23 and A24 are moved. Instead, the teaching-data updater 111g may move only any one of the approach points A23 and A24.

Here, as one example, a description has been given of the case where the approach point A2 is moved alone (that is, the distance a is changed alone). However, this should not be construed in a limiting sense. Corresponding to the shape of the workpiece W and/or the position of the obstacle SH, the distance c may be changed alone or the distance a and the distance c may be changed.

For example, taking the working point WP4 as an example, the approach points A14 and A24 may be moved in the negative direction of an Fz4-axis to change the distance c. Furthermore, the distance a may be changed by moving the approach point A24 in the negative direction of the Fz4-axis. This change may be made to only one of the consecutive working points WP in the working order.

Here, this method for moving the approach point A is similar in the case where the end effector 35 positioned in the approach point A interferes with the obstacle SH (not illustrated).

Figure 9C:
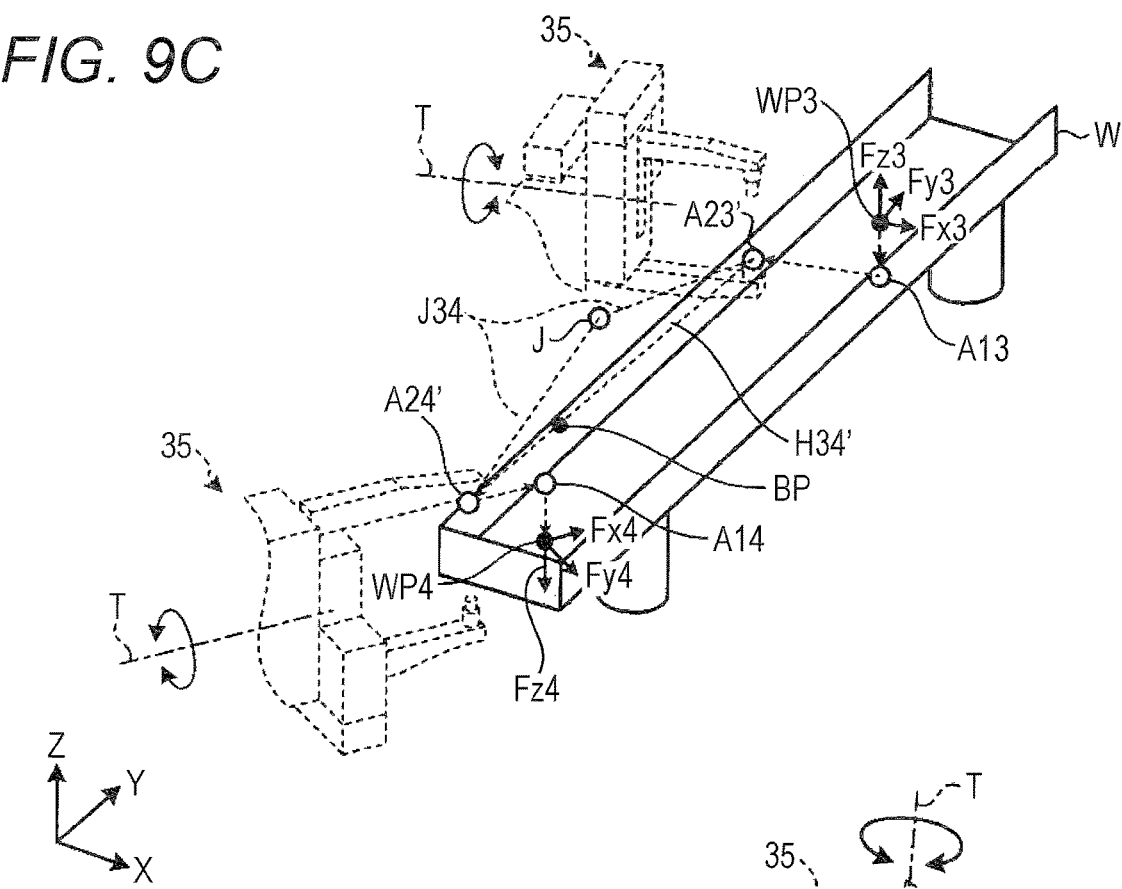
FIG. 9C is an explanatory view (third) for describing the changing method of the positions of the approach points according to the modification (first)

FIG. 9C illustrates the passing point J generated by the teaching-data updater 111g in the position farther from the workpiece W than the virtual line H34'. The teaching-data updater 111g generates a virtual line J34, which connects between the approach points A23' and A24' via the passing point J. Here, in this case, the virtual line H34' may interfere with the workpiece W (see the interference point BP in FIG. 9C). The count of the passing points J is not limited to one, but may be plural.

Generating the passing point J as just described allows avoiding the situation where the movement distance of the approach point A related to the change of the virtual line H becomes excessively large. Accordingly, the operation path of the robot 30 can be shortened.

Here, also in the teaching method according to the modification (first), in some cases, the going-way and the returning-way may be identical in the approach path of the working point WP (the working points WP1 to the working points WP9). In this case, the check box of "MATCH OPERATIONS BEFORE AND AFTER" (see FIG. 5) can be turned ON. Hereinafter, as one example, a description will be specifically given of the case where the end effector 35 moves from the working point WP3 to WP4 (see FIG. 9B).

In the case where the check box of "MATCH OPERATIONS BEFORE AND AFTER" is turned ON, the end effector 35 reaches the working point WP3 from the approach point A23' illustrated in FIG. 9B via the approach point A13 and then returns to the approach point A23' via the approach point A13 again. Subsequently, the end effector 35 moves to the approach point A24'. Here, the above-described method for moving the end effector 35 (the robot 30) is applied to all working points WP (the working points WP1 to the working points WP9) belonging to the workpiece W.

Accordingly, the going-way and the returning-way in the approach path of the working point WP belonging to the workpiece W become identical. This allows reducing the workload and the required time related to generation of the teaching data of the robot 30.

Figure 9D:
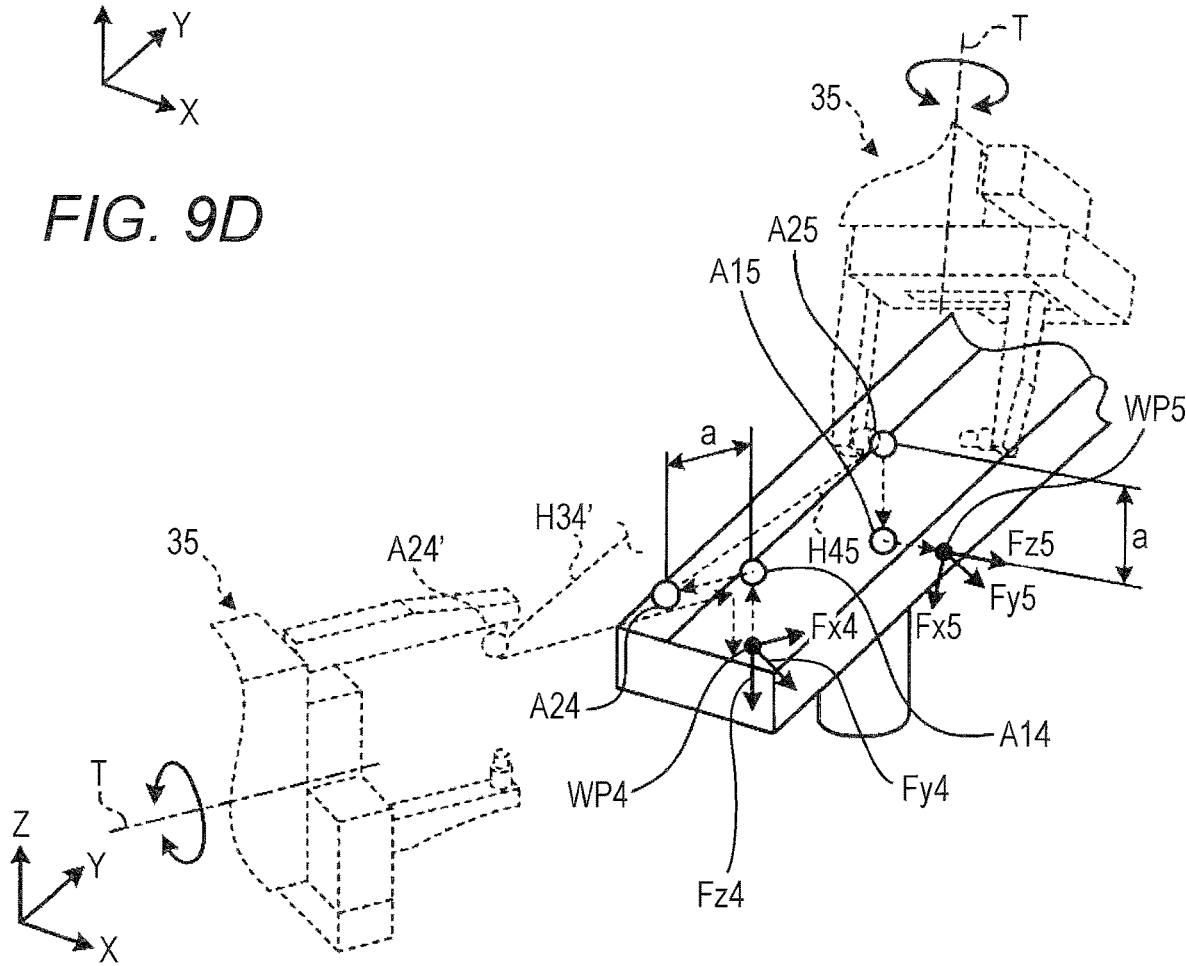
FIG. 9D is an explanatory view (fourth) for describing the changing method of the positions of the approach points according to the modification (first)

On the other hand, turning OFF the check box of "MATCH OPERATIONS BEFORE AND AFTER" (see FIG. 5) allows further shortening the operation path of the robot 30. Hereinafter, the detail of this point will be described later using FIG. 9D. In FIG. 9D, as one example, a description will be given of the case where the end effector 35 moves from the working point WP4 to the working point WP5 illustrated in FIG. 7. Here, FIG. 9D illustrates the end effector 35 positioned in the approach points A24' and A25 by dotted lines. Also in FIG. 9D, the omitted portions such as the workpiece W and the working point WP3 are similar to those in FIG. 9B.

As illustrated in FIG. 9D, a virtual line H45 connecting the approach points A24 and A25 does not interfere with the workpiece W. Therefore, the teaching-data updater 111g generates (updates) the teaching data for setting the going-way as the way from the approach point A24' and similarly the returning-way as the way to the approach point A24 in the approach path of the end effector 35 to the working point WP4. In this case, the end effector 35 moves to the working point WP5 via the approach points A14, A24, A25, and A15 in this order (see the dotted arrow in FIG. 9D).

This ensures a short movement distance of the end effector 35 compared with the case where the end effector 35 moves to the approach point A25 from the approach point A15 via the approach point A24'. Accordingly, the operation path of the robot 30 can be shortened.

As just described, the teaching method according to the modification (first) generates the virtual line H connecting the approach points A farthest from the two working points WP. Furthermore, it is determined whether this virtual line H interferes with the workpiece W or the obstacle SH (not illustrated).

This allows easily and automatically generating the teaching data of the robot 30 to avoid interference with the workpiece W and the obstacle SH also in the case where the plurality of approach points A is set to the working point WP. Accordingly, the teaching method according to the modification (first) allows reducing the workload and the required time related to generation of the teaching data.

The teaching method according to the modification (first) moves the approach points A along the direction of one axis (such as the Rx-axis) in the R coordinate system (see FIG. 5). Accordingly, changing one parameter allows generating the teaching data of the robot 30 to avoid interference with the workpiece W and the obstacle SH. Accordingly, the processing load of the teaching control device 11 (see FIG. 1) can be reduced. As a result, the teaching data of the robot 30 can be more simply and easily generated.

The following describes the procedure for performing the teaching method according to the modification (first) in the teaching system 10 with reference to FIG. 8. Here, the following describes, as an example, the case where two approach points A, that is, a first approach point (the approach point A1) and a second approach point (the approach point A2) are disposed for each working point WP. Hereinafter, the first and second approach points are sometimes referred to collectively as the "approach points A." The description overlapped with the teaching method according to the embodiment, which has been described using FIG. 8, will be omitted.

As illustrated in FIG. 8, the operator sets the first and second approach points to the working point WP (in step S101, see FIG. 5). The decider 111d groups the working points WP based on the first approach direction toward the working point WP, and sort the groups (in step S102). Then, the decider 111d decides the working orders of the working points WP based on the first approach direction (in step S103, see FIG. 7).

Based on the working orders of the working points WP, the teaching-data generator 111e generates the teaching data of the robot 30 for the path of the work tool (the end effector 35) including the virtual line H, which connects the second approach points of the two consecutive working points WP in the working order (in step S104).

The determiner 111f determines whether the virtual line H interferes with the workpiece W or the obstacle SH other than the workpiece W (in step S105). In the case where the virtual line H interferes with the workpiece W or the obstacle SH (Yes in step S105), the teaching-data updater 111g changes the positions of the approach points A (in step S106, see FIGS. 9B to 9C). Subsequently, the process in step S105 and later processes are repeated. In the case where the virtual line H does not interfere with the workpiece W or the obstacle SH (No in step S105), the process in step S107 and later processes proceed.

Subsequently, the determiner 111f determines whether the work tool (the end effector 35) positioned in the approach path, that is, the work tool moving between the working point WP and the approach point A interferes with the workpiece W or the obstacle SH (in step S107). In the case where the end effector 35 interferes with the workpiece W or the obstacle SH (Yes in step S107), the teaching-data updater 111g changes the positions of the approach points A (in step S108, see FIG. 9D). Subsequently, the process in step S105 and later processes are repeated In the case where the end effector 35 interferes with the workpiece W or the obstacle SH (No in step S107), the teaching-data updater 111g updates the teaching data (in step S109) and terminates the process.

Incidentally, a description has been given of the case where the spot welding gun as the work tool is the end effector 35 of the robot 30 so far. This, however, should not be construed in a limiting sense. The robot 30 only needs to be configured to change the relative positional relationship between the work tool and the workpiece W.

Figure 10:
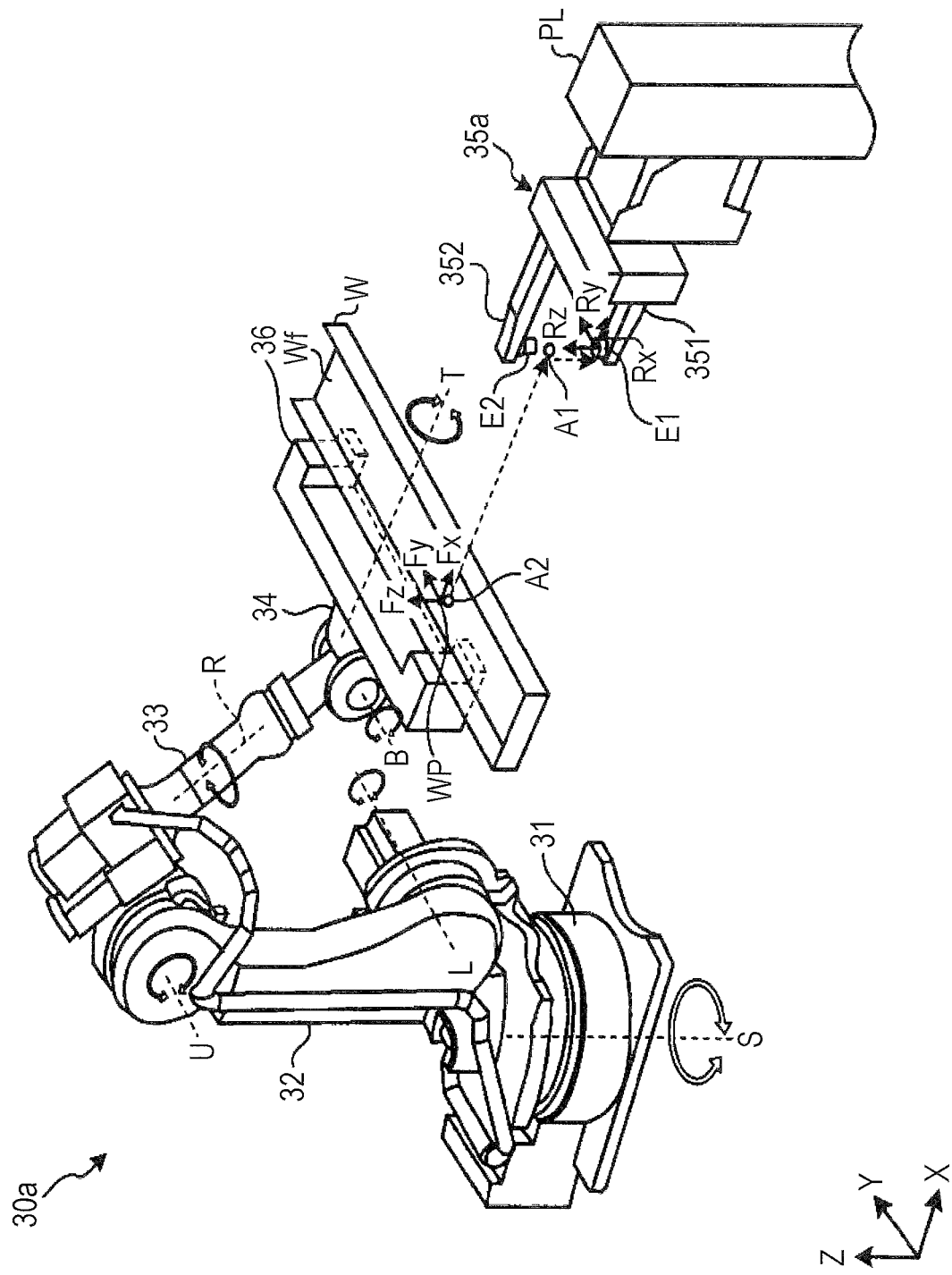
FIG. 10 is a pattern diagram illustrating a robot according to a modification (second).

Therefore, the following describes, as a modification, the case where the robot 30 moves the workpiece W to a fixed work tool (spot welding gun) using FIG. 10. FIG. 10 is a pattern diagram illustrating a robot 30a according to a modification (second). Here, FIG. 10 illustrates only a part of a plurality of working points WP belonging to the workpiece W.

This modification is, for example, a modification of the robot 30 illustrated in FIG. 1 and the like. Accordingly, in the description of this modification, like reference numerals designate elements substantially identical to those of the robot 30 in FIG. 1 and the like, and therefore such elements will not be further elaborated here.

As illustrated in FIG. 10, in the robot 30a according to the modification (second), the flange portion 34 support, in its tip portion, the base end portion of a holder 36, which holds the workpiece W, rotatably around the axis T (see the arrow around the axis T in the drawing).

A spot welding gun 35a is supported by a support pillar PL installed on the floor surface or the like. The robot 30a moves the workpiece W toward the fixed work tool (the spot welding gun 35a) to carry out a predetermined work (spot welding) in the working point WP.

Here, because the spot welding gun 35a illustrated in FIG. 10 is similar to the end effector 35 (spot welding gun), which has been described using FIG. 1, like reference numerals designate substantially identical elements, and therefore such elements will not be further elaborated here.

As just described, the robot 30a according to the modification (second) moves the workpiece W toward the fixed work tool (the spot welding gun 35a). This allows easily and automatically generating the teaching data of the robot 30a without interference between the workpiece W and the work tool also in the case where the robot 30 moves the workpiece W to the fixed work tool. Accordingly, the workload and the required time related to generation of the teaching data can be reduced.

Here, FIG. 10 illustrates, as one example, the case where the two approach points A are set for one working point WP. However, the count of the approach points A is not limited to two.

As just described, the teaching system 10 according to the embodiment of this disclosure includes the teaching-data generator 111e, the determiner 111f, and the teaching-data updater 111g. The teaching-data generator 111e generates the teaching data of the robot 30 having the joint in the virtual environment. The virtual environment includes the work tool (the end effector 35), the robot 30, and the workpiece W to which the plurality of working points WP is preliminarily set. The work tool works on the working points WP. The teaching data causes the robot 30 to move one of the work tool and the workpiece W passing through the approach points A corresponding to the respective working points WP to cause the work tool to relatively reach and separate from the working point WP. The determiner 11 if determines whether the virtual line H interferes with the other of the workpiece W and the work tool. The virtual line H connects the approach points A of the consecutively worked working points WP. The teaching-data updater 111g changes the position of the approach point A on the virtual line H in the case where the determiner 111f determines that the virtual line H interferes with the other of the workpiece W and the work tool.

Additionally, in the example illustrated in FIGS. 1 to 9, the teaching-data generator 111e is configured to generate the teaching data such that the robot 30 moves the work tool passing through the approach points A to cause the work tool to reach and separate from the working points WP. Furthermore, the determiner 111f is configured to determine whether the virtual line H interferes with the workpiece W. Furthermore, the teaching-data updater 111g is configured to change the position of the approach point A on the virtual line H in the case where the determiner 111f determines that the virtual line H interferes with the workpiece W.

On the other hand, in the example illustrated in FIG. 10, the teaching-data generator 111e is configured to generate the teaching data such that the robot 30 moves the workpiece W passing through the approach points A to cause the work tool to relatively reach and separate from the working point WP. Furthermore, the determiner 111f is configured to determine whether the virtual line H interferes with the work tool. Furthermore, the teaching-data updater 111g is configured to change the position of the approach point A on the virtual line H in the case where the determiner 111f determines that the virtual line H interferes with the work tool.

A teaching system according to the embodiment illustrated in FIGS. 1 to 9 includes a teaching-data generator, a determiner, and a teaching-data updater.

The teaching-data generator is configured to generate teaching data of an articulated robot in a virtual environment. The virtual environment includes a work tool, the robot, and a workpiece to which plurality of working points is preliminarily set. The work tool works on the working points. This teaching data includes teaching data of the robot to cause an operation where the work tool passes through approach points corresponding to the respective working points to reach and separate from the working points.

The determiner is configured to determine whether a virtual line interferes with the workpiece or an obstacle. The virtual line connects the adjacent approach points together. The teaching-data updater is configured to change the position of the approach point on the virtual line in the case where the determiner determines that the virtual line interferes with the workpiece.

Accordingly, the teaching system according to the embodiment allows reducing the workload and the required time related to generation of the teaching data.

Here, in the above-described embodiment, as one example of the robot, a single-arm robot having six axes is described. However, the count of axes and the count of arms of the robot are not limited to this.

The embodiment illustrated in FIGS. 1 to 9 employs the case where the workpiece is fixed on the floor surface or the like via the placing table as the example. However, the placement form of the workpiece is not limited to this. The workpiece may be held by a positioner that changes the position and/or the posture of the workpiece to facilitate the work of the robot.

The above-described embodiment employs, as the example, the case where the input operation is performed by the operator mainly using the computer mouse as the operation unit. However, the mode of the input operation is not limited to this. For example, the display unit may be constituted of what is called a multi-touch touchscreen or the like, and the input operation may include a multi-touch operation on this touchscreen. The operation unit may be disposed in what is called a programming pendant, which is disposed communicatively to the robot control device so as to receive the input of the operation instruction to the robot.

The above-described embodiment employs, as the example, the case where the work target is spot welding (point processing). However, the work target is not limited to this. The work target may be, for example, line processing such as arc welding to perform welding along a welding line or application of a sealing material along an application line. In this case, the above-described WP coordinate system may be disposed in the position where the work tool start or terminates the work on the welding line or the application line. The work tool might perform surface processing such as painting or polishing processing. In this case, the above-described R coordinate system may be disposed at a single point of the working portion of the work tool on the workpiece, and the WP coordinate system may be disposed on the movement path (what is called a tool path) to the processing surface.

The above-described embodiment employs, as the example, the case where one or two approach points are disposed for one working point. However, the count of the approach points is not limited to this. Corresponding to the shape of the workpiece or the work tool and/or the work on the working point, any count of the approach points may be disposed for one working point. In this case, the determiner only needs to determine whether the virtual line connecting the approach points farthest from the two working points interferes with the workpiece or the obstacle.

In the above-described embodiment, a description has been given of, as one example, the case where the virtual line connecting the approach points together is a straight line. However, the shape of the virtual line is not limited to a straight line. For example, in the case of FIG. 6A, the postures of the end effector 35 in the respective approach points A1$a$ and A1$b$ are preliminarily set. This allows obtaining the angles of the respective joints of the robot 30 in the case where the end effector 35 (the electrode E1) is positioned in the respective approach points A1$a$ and A1$b$.

Accordingly, the angles of the respective joints of the robot 30 can be changed from the angles in the approach point A1$a$ to the respective angles in the approach point A1$b$, so as to move the end effector 35. In this case, the movement path of the end effector 35 (the electrode E1) moving from the approach point A1$a$ to A1$b$ is not limited to a straight line and becomes a free curve. The determiner 111$f$ may determine whether the virtual line Hab' interferes with the workpiece W or the obstacle SH while using this free curve as the virtual line Hab'.

In the above-described embodiment, the teaching system 10 has the simulation instructor 111$h$. The simulation instructor 111$h$ and the image generator 111$a$ display the continuously changing simulation operation, which includes the virtual image including the robot and the workpiece, on the display unit 12 via the display controller 111$b$ based on the robot's teaching data of generated (updated) by the teaching-data updater 111$g$ and the like. However, the operator sometimes does not need to visually recognize this simulation operation on the display unit. In this case, the teaching system 10 may not include the simulation instructor 111$h$.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

The embodiment of this disclosure may be the following first to eighth teaching systems, first robot system, and first teaching method.

A first teaching system includes a teaching-data generator, a determiner, and a teaching-data updater. The teaching-data generator is configured to generate teaching data of an articulated robot in a virtual environment. The virtual environment includes a work tool, the robot, a workpiece to which a plurality of working points is preliminarily set, and an obstacle. The work tool works on the working points. The teaching data causes the work tool to reach and separate from the working points while passing through approach points corresponding to the respective working points. The determiner is configured to determine whether a virtual line interferes with the workpiece or the obstacle. The virtual line connects the adjacent approach points together. The teaching-data updater is configured to change the position of the approach point related to the virtual line in a case where the determiner determines that the virtual line interferes with the workpiece or the obstacle.

In a second teaching system according to the first teaching system, the teaching-data updater is configured to shift the position of the approach point in a direction from the working point toward the approach point. The determiner is configured to determine whether the virtual line connecting the shifted approach points together interferes with the workpiece or the obstacle.

In a third teaching system according to the second teaching system, the teaching-data updater is configured to: generate a passing point in a position farther from the workpiece or the obstacle than the virtual line including the shifted approach points; and update the teaching data such that the work tool passes through the passing point between the shifted approach points. The determiner is configured to determine whether the virtual line passing through the passing point interferes with the workpiece or the obstacle.

A fourth teaching system according to any one of the first to third teaching systems further includes a decider configured to decide working orders of the working points. The decider groups the working points based on an approach direction as a direction from the approach point toward the working point.

In a fifth teaching system according to the fourth teaching system, the decider is configured to decide the working orders of the working points for each of the groups such that a rotation direction of a rotation axis in the joint of a base end of the robot becomes constant. The teaching-data generator is configured to generate teaching data based on the working orders.

In a sixth teaching system according to any one of the first to fifth teaching systems, the determiner is configured to further determine whether the work tool interferes with the workpiece or the obstacle in the teaching data. The teaching-data updater is configured to shift the position of the approach point in a direction from the approach point toward the working point or a direction from the working point toward the approach point in a case where the determiner determines that the work tool interferes with the workpiece or the obstacle.

A seventh teaching system according to any one of the first to sixth teaching systems further includes an image generator configured to generate, in the virtual environment, a virtual image including the work tool, the robot, and the workpiece.

A first robot system is configured to process the workpiece in accordance with the teaching data generated by any one of the first to seventh teaching systems.

A first teaching method includes a teaching-data generating step, a determining step, and a teaching-data updating step. The teaching-data generating step is generating teaching data of an articulated robot in a virtual environment. The virtual environment includes a work tool, the robot, and a workpiece to which a plurality of working points is preliminarily set. The work tool works on the working points. The teaching data causes the work tool to reach and separate from the working points passing through approach points corresponding to the respective working points. The determining step is determining whether a virtual line interferes with the workpiece or the obstacle. The virtual line connects the adjacent approach points together. The teaching-data updating step is changing the position of the approach point related to the virtual line in a case where the determining step determines that the virtual line interferes with the workpiece or the obstacle.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A system comprising:
   a teaching-data generator configured to generate teaching data for a robot having a joint using a virtual environment, the virtual environment including a virtual representation of a work tool, a virtual representation of the robot having the joint, and a virtual representation of a workpiece to which a plurality of working points is preliminarily set, the teaching data causing the robot to move one of the work tool and the workpiece passing through approach points corresponding to the respective working points to cause the work tool to relatively reach and separate from the working points;
   a decider configured to decide working orders of the working points, the decider being configured to group the working points based on an approach direction as a direction from the approach point toward the working point, the decider being configured to decide the working orders based on the groups;
   a determiner configured to determine whether a virtual line interferes with another of the virtual representation of the workpiece and the virtual representation of the work tool in the virtual environment, the virtual line connecting the approach points of consecutively worked working points together, the consecutively worked working points being based on the working orders of the working points;
   a teaching-data updater configured to change a position of the approach point on the virtual line in a case where the determiner determines that the virtual line interferes with the other of the virtual representation of the workpiece and the virtual representation of the work tool in the virtual environment; and
   a robot control device configured to control operation of the robot in accordance with the teaching data generated to process the workpiece.

2. The system according to claim 1, wherein
   the teaching-data generator is configured to generate the teaching data such that the robot moves the work tool passing through the approach points to cause the work tool to reach and separate from the working points,
   the determiner is configured to determine whether the virtual line interferes with the virtual representation of the workpiece, and
   the teaching-data updater is configured to change the position of the approach point on the virtual line in a case where the determiner determines that the virtual line interferes with the virtual representation of the workpiece.

3. The system according to claim 2, wherein
   the virtual environment includes a virtual representation of an obstacle,
   the determiner is configured to determine whether the virtual line interferes with one of the virtual representation of the workpiece and the virtual representation of the obstacle, and
   the teaching-data updater is configured to change the position of the approach point on the virtual line in a case where the determiner determines that the virtual line interferes with one of the virtual representation of the workpiece and the virtual representation of the obstacle.

4. The system according to claim 3, wherein
   the teaching-data updater is configured to shift the position of the approach point in a direction from the working point toward the approach point, and
   the determiner is configured to determine whether the virtual line connecting the shifted approach points together interferes with one of the virtual representation of the workpiece and the virtual representation of the obstacle.

5. The system according to claim 4, wherein
the teaching-data updater is configured to update the teaching data to:
generate a passing point in a position farther from one of the virtual representation of the workpiece and the virtual representation of the obstacle than the virtual line including the shifted approach points; and
cause the work tool to pass through the passing point between the shifted approach points, and
the determiner is configured to determine whether the virtual line passing through the passing point interferes with one of the virtual representation of the workpiece and the virtual representation of the obstacle.

6. The system according to claim 1, wherein
the decider is configured to decide the working orders of the working points for each of the groups in an order where a rotation direction of a rotation axis in the joint of a base end of the robot becomes constant, and
the teaching-data generator is configured to generate the teaching data based on the working orders.

7. The system according to claim 3, wherein
the determiner is configured to further determine whether the virtual representation of the work tool interferes with one of the virtual representation of the workpiece and the virtual representation of the obstacle in the teaching data, and
the teaching-data updater is configured to shift the position of the approach point in one direction of a direction from the approach point toward the working point and a direction from the working point toward the approach point in a case where the determiner determines that the virtual representation of the work tool interferes with one of the virtual representation of the workpiece and the virtual representation of the obstacle.

8. The system according to claim 1, further comprising an image generator configured to generate a virtual image in the virtual environment, the virtual image including the virtual representation of the work tool, the virtual representation of the robot, and the virtual representation of the workpiece.

9. The system according to claim 8, further comprising:
a display unit; and
a display controller configured to display the virtual image on the display unit.

10. The system according to claim 9, further comprising
a simulation instructor configured to notify the image generator about a simulation instruction, the simulation instruction causing regeneration of the virtual image of the virtual representation of the robot whose position and/or posture has been changed corresponding to contents of teaching data notified from the teaching-data updater, wherein
the image generator is configured to regenerate the virtual image based on the simulation instruction and display the virtual image on the display unit via the display controller.

11. The system according to claim 1, wherein
the teaching-data generator is configured to generate the teaching data such that the robot moves the workpiece passing through approach points to cause the work tool to relatively reach and separate from the working points,
the determiner is configured to determine whether the virtual line interferes with the virtual representation of the work tool, and
the teaching-data updater is configured to change the position of the approach point on the virtual line in a case where the determiner determines that the virtual line interferes with the virtual representation of the work tool.

12. A robot system comprising:
the system according to claim 1; and
a robot configured to be controlled by the robot control device in accordance with the teaching data generated to process the workpiece.

13. The system according to claim 1,
wherein
the decider is configured to decide the working orders of the working points in an order where a rotation direction of a rotation axis in the joint of a base end of the robot becomes constant, and
the teaching-data generator is configured to generate the teaching data based on the working orders.

14. A method comprising:
generating teaching data for a robot having a joint using a virtual environment, the virtual environment including a virtual representation of a work tool, a virtual representation of the robot having the joint, and a virtual representation of a workpiece to which a plurality of working points is preliminarily set, the teaching data causing the robot to move one of the work tool and the workpiece passing through approach points corresponding to the respective working points to cause the work tool to relatively reach and separate from the working points;
deciding working orders of the working points by grouping the working points based on an approach direction as a direction from the approach point toward the working point, the working orders being based on the groups;
determining whether a virtual line interferes with another of the virtual representation of the workpiece and the virtual representation of the work tool in the virtual environment, the virtual line connecting the approach points of the consecutively worked working points together, the consecutively worked working points being based on the working orders of the working points;
changing position of the approach point on the virtual line in a case where the virtual line is determined to interfere with the other of the virtual representation of the workpiece and the virtual representation of the work tool in the virtual environment; and
controlling operation of the robot in accordance with the teaching data generated to process the workpiece.

15. The method according to claim 14, wherein
generating the teaching data is generating the teaching data such that the robot moves the work tool passing through the approach points to cause the work tool to reach and separate from the working points,
the determining is determining whether the virtual line interferes with the virtual representation of the workpiece, and
changing the position of the approach point is changing the position of the approach point on the virtual line in a case where the virtual line is determined to interfere with the virtual representation of the workpiece.

16. The method according to claim 14,
wherein
the working orders of the working points are decided in an order where a rotation direction of a rotation axis in the joint of a base end of the robot becomes constant, and
the teaching data is generated based on the working orders.

17. A system comprising:

means for generating teaching data for a robot using a virtual environment, the virtual environment including a virtual representation of a work tool, a virtual representation of the robot, and a virtual representation of a workpiece, the teaching data causing the robot to move one of a work tool and a workpiece passing through an approach point corresponding to a working point of the workpiece to cause the work tool to relatively reach and separate from the working point;

means for deciding working orders of the working points by grouping the working points based on an approach direction as a direction from the approach point toward the working point, the working orders being based on the groups;

means for determining whether a virtual line interferes with another of the virtual representation of the workpiece and the virtual representation of the work tool in the virtual environment, the virtual line connecting the approach points of consecutively worked working points together, the consecutively worked working points being based on the working orders of the working points;

means for changing position of the approach point on the virtual line in a case where the virtual line is determined to interfere with the other of the virtual representation of the workpiece and the virtual representation of the work tool in the virtual environment; and means for controlling operation of the robot in accordance with the teaching data generated to process the workpiece.

18. The system according to claim 17, wherein the means for deciding is configured to decide the working orders of the working points in an order where a rotation direction of a rotation axis in the joint of a base end of the robot becomes constant, and the means for generating teaching data is configured to generate the teaching data based on the working orders.

* * * * *